United States Patent
Pellizzari et al.

(10) Patent No.: US 12,513,419 B1
(45) Date of Patent: Dec. 30, 2025

(54) METHODS FOR MEASURING OPTICAL-PHASE INFORMATION AND FOR PRODUCING FOCUSED, REDUCED SPECKLE IMAGES FROM ACTIVE ILLUMINATION AND DIRECT DETECTION

(71) Applicant: Government of the United States, as represented by the Secretary of the Air Force, Wright-Patterson AFB, OH (US)

(72) Inventors: Casey Pellizzari, Colorado Springs, CO (US); Timothy Bate, Colorado Springs, CO (US); Mark Spencer, Waipahu, HI (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 86 days.

(21) Appl. No.: 18/404,146

(22) Filed: Jan. 4, 2024

Related U.S. Application Data

(60) Provisional application No. 63/480,165, filed on Jan. 17, 2023.

(51) Int. Cl.
*H04N 23/951* (2023.01)
*G02B 27/48* (2006.01)
(Continued)

(52) U.S. Cl.
CPC ........... *H04N 23/951* (2023.01); *G02B 27/48* (2013.01); *G06T 5/60* (2024.01); *G06T 5/70* (2024.01); *G06T 2207/20076* (2013.01)

(58) Field of Classification Search
CPC ........ H04N 23/951; G02B 27/48; G06T 5/60; G06T 5/70; G06T 2207/20076
See application file for complete search history.

(56) References Cited

U.S. PATENT DOCUMENTS

| 8,103,045 | B2 * | 1/2012 | McGraw | G01W 1/02 |
| | | | | 382/280 |
| 8,265,375 | B2 * | 9/2012 | Shirley | G01B 9/02096 |
| | | | | 356/600 |

(Continued)

OTHER PUBLICATIONS

R. Egami, R. Horisaki, L. Tian, et al., "Relaxation of mask design for single-shot phase imaging with a coded aperture," Applied optics 55(8), 1830-1837 (2016).

(Continued)

*Primary Examiner* — Hung H Lam
(74) *Attorney, Agent, or Firm* — AFMCLO/JAZ; Jeffrey V. Bamber

(57) ABSTRACT

A system and method for measuring the optical phase of incident light using direct detection and for producing speckle-free images, designed for use with coherent illumination and reflective imaging geometries. Applications include speckle mitigation for active imaging, resolution enhancement using synthetic aperture methods, and digitally correcting aberrations in images or refocusing. The system hardware combines pupil-plane phase modulation with dual-plane direct-detection measurements of the image and pupil-plane intensities. The reconstruction software uses a regularized-inversion estimation framework that couples a data-fidelity model, a physics-based model for rough surface scattering of coherent light, and convolutional neural network model for natural images. The regularized inversion framework is solved iteratively using alternating projection.

22 Claims, 14 Drawing Sheets

(51) Int. Cl.
    *G06T 5/60*     (2024.01)
    *G06T 5/70*     (2024.01)

(56) References Cited

U.S. PATENT DOCUMENTS

| | | |
|---|---|---|
| 10,416,609 B1 | 9/2019 | Pellizzari et al. |
| 10,591,871 B1 | 3/2020 | Pellizzari et al. |
| 10,606,055 B2 | 3/2020 | Horstmeyer et al. |
| 2010/0091127 A1* | 4/2010 | Hampton ............... G06V 10/52 348/E5.022 |
| 2014/0270565 A1* | 9/2014 | Poyneer ................ G06T 3/4053 382/260 |
| 2017/0059845 A1 | 3/2017 | Waller et al. |
| 2020/0150266 A1* | 5/2020 | Cossairt ................ H04N 23/81 |

OTHER PUBLICATIONS

J. R. Fienup, "Direct-detection synthetic-aperture coherent imaging by phase retrieval," Optical Engineering 56(11), 113111 (2017).

J. Holloway, Y. Wu, M. K. Sharma, et al., "Savi: Synthetic apertures for long-range, subdiffraction-limited visible imaging using fourier ptychography," Science advances 3(4), e1602564 (2017).

C. J. Pellizzari, M. F. Spencer, and C. A. Bouman, "Coherent plug-and-play: Digital holographic imaging through atmospheric turbulence using model-based iterative reconstruction and convolutional neural networks," IEEE Transactions on Computational Imaging 6, 1607-1621 (2020).

\* cited by examiner

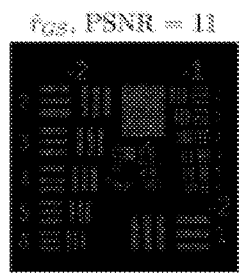 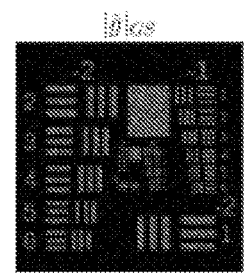 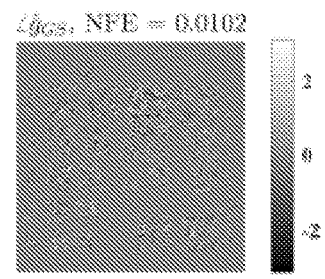
FIG. 10A  FIG. 10B  FIG. 10C
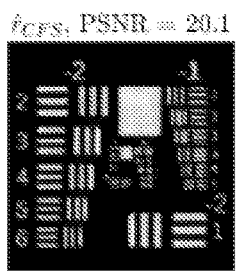 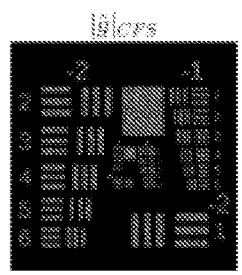 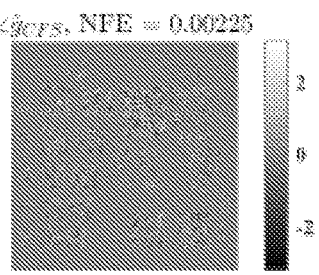
FIG. 10D  FIG. 10E  FIG. 10F

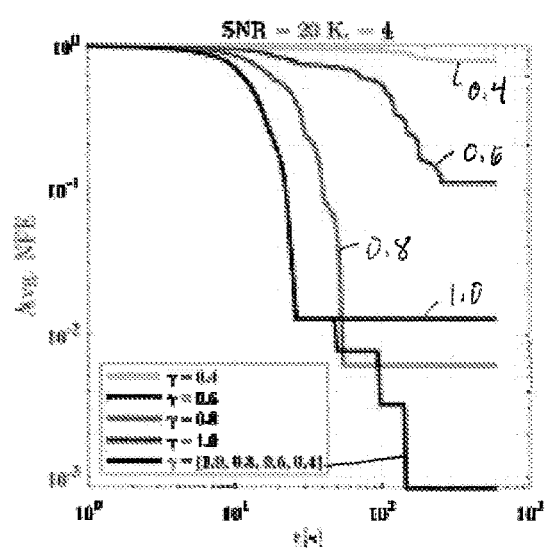
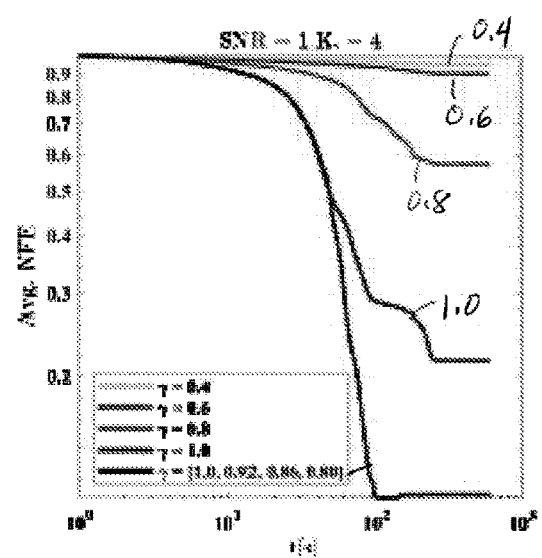
FIG. 11A                    FIG. 11B

METHODS FOR MEASURING OPTICAL-PHASE INFORMATION AND FOR PRODUCING FOCUSED, REDUCED SPECKLE IMAGES FROM ACTIVE ILLUMINATION AND DIRECT DETECTION

CROSS-REFERENCE TO RELATED APPLICATIONS

This application claims the benefit of priority under 35 U.S.C. § 119(e) to U.S. Provisional Application Ser. No. 63/480,165 entitled "Optical-Field and Imaging Sensor for Reflective Imaging with Coherent Illumination and Direct Detection", filed Jan. 17, 2023, the contents of which are incorporated herein by reference in their entirety.

RIGHTS OF THE GOVERNMENT

The invention described herein was made by employees of the United States Government and may be manufactured and used by or for the Government of the United States of America for governmental purposes without the payment of any royalties thereon or therefore.

FIELD OF THE INVENTION

The present invention relates generally to imaging sensors and methods of imaging objects and, more particularly, to computational optical-field sensors that measure both the amplitude and phase of optical light and methods of using the same.

BACKGROUND

Electromagnetic waves, such as optical fields, are represented as having both an amplitude and a phase. In imaging, the phase of light contains useful information about the source and about the propagation channel. With phase information, synthetic-aperture (SA) imaging can be performed by stitching together many separate measurements to obtain an image with resolution beyond the diffraction limit of the physical optics. Aberrations can also be measured and digitally corrected by a technique referred to herein as digital adaptive optics (DAO).

Unfortunately, conventional optical sensors only measure the squared amplitude of optical fields and are therefore blind to phase information. To measure both the amplitude and phase of an optical field, either interferometric techniques (interferometry utilizes devices that extract information from interference of superimposed waves), such as digital holography (DH), or phase retrieval (PR) techniques must be used. Both of these approaches have limitations and drawbacks. For interferometric methods, coherent illumination and coherent detection (i.e., spatial or temporal heterodyning of a signal with a reference) can be used. While interferometric techniques for SA imaging and DAO can be used, it adds additional hardware and complexity, which increases the size, weight, and cost of the sensor.

Alternatively, PR methods can be used to sense the phase of coherent, or partially coherent, light using direct detection. There is a plethora of existing PR techniques to choose from. However, there are still limits to using PR methods in practice. For coherent illumination and reflective imaging geometries, rough surface scattering leads to speckle, which causes state-of-the-art PR techniques to fail.

Speckle results from coherent illumination and rough surface scattering. When the surface of an object is rough relative to the wavelength of the coherent illumination, the complex-valued reflection coefficient, g, has a uniformly distributed phase when integrated over a finite area (e.g., a pixel). As such, g results in speckled images upon propagation from the object plane to the image plane. These speckled images differ from the speckle-free images obtained from the real-valued reflectance function, r, that are seen in conventional images. FIGS. 1 and 2 show example images associated with r and g, respectively.

While state-of-the-art PR methods fail in the presence of speckle, more traditional methods, like the Gerchberg-Saxon (GS) algorithm can still work when speckle is present; however, they require high signal-to-noise ratios (SNRs) and multiple measurements. Such restrictions lessen the usefulness of these methods for low-signal or time-sensitive applications.

In J. R. Fienup, "Direct-detection synthetic-aperture coherent imaging by phase retrieval," *Optical Engineering* 56(11), 113111 (2017), the author used coherent illumination, dual-plane measurements (i.e., simultaneous pupil- and image-plane measurements) and the GS algorithm as part of a SA framework. Using this framework, the author reconstructed a high-resolution reflection coefficient, g, from a series of overlapping low-resolution images. To stitch together local measurements into a high-resolution estimate of the field, Fienup used a separate phasing algorithm. While this approach works in the presence of speckle, it is limited in the following ways. First, it relies on the GS algorithm, which is sensitive to noise, even when data is collected in multiple measurement planes. Second, each local field must be estimated separately. As a result, knowledge of the high-resolution object cannot be used to better constrain these local estimates. Third, this framework requires a separate phase correction algorithm, which in turn requires ten independent speckle realizations. Depending on the application, collecting ten speckle realizations requires added measurement complexity in the sense that the object needs to move relative to the sensor(s) or vice versa. Multiple lasers could also be used to obtain independent speckle realizations but at the cost of added hardware complexity. Therefore, collecting the necessary data limits the ability to image dynamic objects. Lastly, the approach produces speckled images, which are difficult to interpret. Even if ten independent realizations could be collected, the speckle contrast would only be reduced by approximately a third.

In J. Holloway, Y. Wu, M. K. Sharma, et al., "Savi: Synthetic apertures for long-range, subdiffraction-limited visible imaging using Fourier ptychography," *Science advances* 3(4), e1602564 (2017), the authors present an alternate method for long-range SA imaging using coherent illumination and a Fourier ptychography (FP) framework. One benefit of using FP for SA imaging is that the high-resolution image can be reconstructed directly from the set of measurements rather than having to first estimate the field at each measurement location, then stitch those estimates together to reconstruct the high-resolution image. Unlike other FP approaches, this method is specifically designed for macroscopic reflective imaging scenarios. To overcome the limitations imposed by speckle, the authors use a filter to remove these unwanted variations. While this filter helps some, the approach still produces results with significant variations. Furthermore, to reduce noise and compensate for large dynamic range in speckle images, this approach requires between 15-30 measurements at each location, with large spatial overlap between measurements. These restrictions may not be practical for all applications.

In prior work, we developed a Bayesian framework for digital holographic (DH) image reconstruction that was robust to speckle. This prior work is described in U.S. Pat. Nos. 10,416,609 B1 and 10,591,871 B1, Pellizzari, et al., both of which are incorporated by reference herein. Our approach leveraged physics-based models for rough-surface scattering and can estimate the more-smooth reflectance function, r, from a single measurement, commonly known as single-shot data. By estimating r, rather than the reflection coefficient, g, this method is better able to regularize images. Furthermore, this approach allows state-of-the-art Plug-and-Play (PnP) prior models to be used, which work well for regularizing smooth images. PnP methods leverage the modeling power of deep convolution neural networks (CNNs) to learn natural-images distributions. Unfortunately, the methods in our prior work are designed for systems that use interferometric measurement techniques. Therefore, they rely on complex detection hardware to recover phase information and cannot work for direct detection measurements. Furthermore, these methods are not designed for SA imaging.

Therefore, a need exists for improved imaging sensors and methods of imaging objects. In particular, a need exists for a computational optical-field sensor (COFS) for imaging and measuring the full optical field, amplitude and phase, in the presence of rough surface scattering. A need further exists for such a sensor that is suitable for both synthetic-aperture imaging and for digital adaptive optics techniques. A need exists for a sensor and methods that can use phase retrieval (PR) techniques, but are not subject to the problem with coherent illumination and reflective imaging geometries in which rough surface scattering leads to speckle, which causes state-of-the-art PR techniques to fail. Finally, there is a need for improved imaging sensors and methods of imaging objects in which the size, cost, and complexity of the sensors are reduced, and that are suitable for low-signal and/or time-sensitive applications.

SUMMARY OF INVENTION

The present invention relates generally to imaging sensors and methods of imaging objects and, more particularly, to computational optical-field sensors that measure both the amplitude and phase of optical light and methods of using the same.

While the invention will be described in connection with certain embodiments, it will be understood that the invention is not limited to these embodiments. To the contrary, this invention includes all alternatives, modifications, and equivalents as may be included within the spirit and scope of the present invention.

The present invention provides a new computational optical-field sensor (COFS) for imaging and measuring the full optical field, amplitude and phase, in the presence of rough surface scattering. The sensor and method combine a simple and customizable optical system with a regularized-inversion framework that produces estimates of both the real-valued image and the optical field from a single speckle realization. The sensor is suitable for both synthetic-aperture (SA) imaging and for digital adaptive optics (DAO).

Through the present sensor design, measurement diversity is obtained by either applying phase modulation at the entrance pupil to the imaging system, obtaining dual-plane measurements of the image and pupil-plane intensities, or by using both of these techniques together. The reconstruction framework may, in some cases, reconstruct a high-resolution estimate of the object directly from many low-resolution measurements. However, unlike many Fourier ptychography (FP) methods, in the present method, these low-resolution measurements may be obtained by spatially scanning the sensor, rather than changing the illumination angle. Additionally, the present approach does not have the measurement-overlap requirements found in Fourier ptychography (FP). In other cases, such as in removing the effects of atmospheric turbulence), a single image is taken and the output has the same resolution, but is corrected for atmospheric degradation.

In the present method, the reflectance function, r, and the reflection coefficient, g, are jointly estimated using a regularized inversion framework. This unique framework couples a data-fidelity model, a physics-based model for rough surface scattering of coherent light, and a deep convolution neural networks (CNN) model for natural images using state-of-the-art Plug-and-Play PnP models. This model-based approach helps better constrain the phase retrieval (PR) problem and leverages state-of-the-art CNN prior models for a reduced-speckle, real-valued image, and in some cases, a speckle-free, real-valued image. The method works well in conditions that are currently not feasible for phase retrieval (PR) techniques or synthetic-aperture (SA) imaging using existing methods. These conditions include low signal-to-noise ratios (SNRs), a limited number of measurements at each location, and the limitation of a single-speckle realization.

According to one embodiment of the present invention, a computational optical-field sensor (COFS) that measures both the amplitude and phase of optical light and provides an image using coherent illumination and direct detection of reflected light from an object is disclosed. The computational optical-field sensor may comprise:

a primary imaging lens located in the pupil plane, that focuses incoming light;

a camera positioned to receive incoming light after the light passes through the primary imaging lens, said camera defining an image plane; and a computing device operationally connected to the camera, wherein the computational optical-field sensor is configured to generate measurement diversity by taking a plurality of different measurements of said reflected light, said measurements each having a resolution (that may be limited by the size of the optics), and wherein said computing device is configured to run reconstruction software comprising a reconstruction algorithm to reconstruct an image of an object from the measurements and to determine the optical field in the image plane, wherein the image has one or more of the following properties:

a) is a focused reduced speckle image;

b) is a higher resolution reduced speckle image of an object that is reconstructed from a plurality of lower-resolution measurements; and c) is corrected for atmospheric turbulence.

In another embodiment, a method of providing an image and an estimate of the amplitude and phase of the optical field using coherent illumination and direct detection of reflected light from an object is provided. The method may comprise:

a) illuminating an object with a coherent light source so that the object reflects light;

b) sensing and focusing the reflected light with a primary imaging lens so that the reflected light has a first focus onto an image plane at a detector;

c) generating measurement diversity of the reflected light and taking a plurality of diverse measurements of the reflected light; and
d) performing a computational analysis on the measurements in step c) using a reconstruction algorithm to reconstruct an image of an object from the measurements and to determine the optical field in the image plane, wherein the image has one or more of the following properties:
1) is a focused reduced speckle image;
2) is a higher resolution image of an object that is reconstructed from a plurality of lower-resolution measurements; and
3) is corrected for atmospheric turbulence.

In some cases, the measurement diversity in step c) is created by modulating the phase of the reflected light, wherein the modulating occurs before the light is focused onto the image plane at said detector.

In some cases, the primary imaging lens is a spatial light modulator (SLM), and the phase modulation is carried out by the spatial light modulator (SLM).

In some cases, the step c) further comprises one of the following:
1) splitting said reflected light into two portions, wherein a first portion of said reflected light has a first set of measurements measured by said detector which is a first detector at the image plane, and a second portion of said light has a second set of measurements measured by a second detector at a pupil plane; or
2) taking several image plane measurements following modulation.

In some cases, the step c) of generating measurement diversity of the light and taking a plurality of diverse measurements of said light is carried out using one of the following hardware configurations:
1) with a spatial light modulator (SLM) prior to said detector, wherein said measurements comprise sequential measurements that are taken at said detector;
2) with a primary imaging lens, and splitting the light into two portions wherein a first portion of said light is transmitted to said detector, which is a first camera, and a second portion of said light is transmitted to a second camera, wherein said measurements are taken at said first camera and said second camera; and
3) with a spatial light modulator (SLM) prior to said detector, and splitting the light into two portions wherein a first portion of said light is transmitted to said detector, which is a first camera, and a second portion of said light beam is transmitted to a second camera, wherein said measurements are taken at said first camera and said second camera.

In some cases, the computational analysis in step d) comprises a process in which potential solutions are proposed for the reflectance function, the reflection coefficient, and the phase errors caused by turbulence, and the potential solutions are compared against:
1) the data measurements using physics models for rough surface scattering, optical propagation, and light detection, and
2) statistical models for natural images and turbulence-induced phase errors,
wherein only solutions that could have produced the data measured, according to the physics models, and that have a high probability of being from the set of natural images and turbulence-induced phase errors are selected.

In some cases, the object has a complex-valued reflection coefficient, g, and a real-valued reflectance function r, and the computational analysis in step d) comprises alternating between a series of update steps for each of the complex-valued reflection coefficient, g, and the real-valued reflectance function r, wherein the update steps comprise computing with one of 1) equations having a closed form solution, or 2) a test function which is probed to find extrema, wherein the output of each update equation, which is either a closed form solution or an extrema, respectively, represents an intermediate estimate of either the complex-valued optical field or the reflectance function.

In some cases, the step c) further comprises splitting said reflected light into two portions, wherein a first portion of said reflected light has a first set of measurements measured by said detector which is a first camera at the image plane, and a second portion of said light has a second set of measurements measured by a second camera at a pupil plane, wherein the pupil plane and the image plane each define a complex-valued field, and the update steps are as follows, and the update steps are carried out one or more (that is, repeated) times:
1) the complex-valued field in the pupil plane is obtained from the complex-valued field in the camera planes using an update equation with a closed form solution;
2) a test function is generated using the output from step 1 and probed to find the atmospheric phase errors for which the test function is at an extrema;
3) a test function is generated using the output of steps 1 and 2 and probed to find the complex-valued reflection coefficient for which the test function is at an extrema;
4) a test function is generated using the output of step 3 and probed to find the real-valued reflectance for which the test function is at an extrema;
5) a test function is generated using the outputs of steps 1, 2, and 4 and probed to find the complex-valued reflection coefficient for which the test function is at an extrema;
6) a test function is generated using the outputs from steps 1 and 5 and probed to find the atmospheric phase errors for which the test function is at an extrema;
7) the complex-valued field in the pupil plane is obtained using the outputs from steps 5 and 6 using an update equation with a closed form solution; and
8) a test function is generated for each camera measurement, as a function of both location and modulation function used, using the output of step 7 and probed to find the complex-valued field in the camera planes for which each test function is at an extrema.

In some cases, the step c) further comprises splitting said reflected light into two portions, wherein a first portion of said reflected light has a first set of measurements measured by said detector which is a first camera at the image plane, and a second portion of said light has a second set of measurements measured by a second camera at a pupil plane, wherein the pupil plane and the image plane each define a complex-valued field, wherein the update equations are dependent upon:
1) a physics-based model for the propagation of the optical field between the image plane the pupil plane for each camera location and modulation function;
2) a data fidelity term dependent on the complex-valued field in the pupil plane, the reflection coefficient, and a physics-based model for the propagation of the optical field between the pupil and object planes;
3) an optional first regularization term dependent on the atmospheric phase errors;

4) a second regularization term dependent on the reflection coefficient, reflectance, and a physics-based model for rough-surface scattering;
5) a third regularization term dependent on the reflectance and which uses a convolutional neural network to learn the distribution of natural images; and
6) a data fidelity term dependent on the measured intensity on each camera, the estimated optical field in the pupil plane, and a physics-based model for the propagation of the optical field between the pupil plane the image plane for each camera location and modulation function. (If the optional first regularization term is not used, the second and third regularization terms may be renamed as the first and second regularization terms, respectively.)

In some cases, probing the test functions is performed for a plurality of iterations.

In some cases, the complex-valued fields in the image plane are initialized using the square root of the intensity of the image-plane measurements as the amplitude and a random array for the phase.

In some cases, the complex-valued field in the pupil plane is initialized using physics-based model for the propagation of the optical field between the image plane and the pupil plane for each camera location and modulation function.

In some cases, the atmospheric phase errors are initialized using a uniform array (i.e., zeros).

In some cases, the reflection coefficient is initialized using the complex-valued field in the pupil plane a physics-based model for the propagation of the optical field between the pupil plane and the object plane.

In some cases, the reflectance is initialized using the magnitude squared of the reflection coefficient.

In some cases, the method further comprises forming a focused reduced speckle image from the estimated reflectance values for which the test function is at an extremum.

In some cases, the method further comprises determining the complex-valued optical field in the image plane from the estimated reflection coefficient for which the test function is at an extremum.

In some cases, the method further comprises forming an image with higher resolution than the native resolution of each individual measurement limited by the size of the optics.

In some cases, the method further comprises determining the atmospheric phase errors present along the propagation path between the illuminated object and the pupil plane for which the test function is at an extremum.

In some cases, the method further comprises forming a focused reduced speckle image from a measured image distorted by atmospheric turbulence.

The steps described herein can be performed in any suitable order and, in some cases, one or more steps can be performed simultaneously. In some cases, one or more steps and/or the outputs of the methods may be optional.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 10A is an example reconstruction of the reflectance function obtained using the Gerchberg Saxon method. The peak signal-to-noise ratio (PSNR) is shown as a measure of image quality. Higher PSNRs are better.

FIG. 10B is the magnitude of the reflection coefficient obtained using the Gerchberg Saxon method.

FIG. 10C is the point-wise Normalized Field Error (NFE) for the reflection coefficient obtained using the Gerchberg Saxon method. The total NFE error is listed at the top.

FIG. 10D an example reconstruction of the reflectance function obtained using the COFS method.

FIG. 10E is the magnitude of the reflection coefficient obtained using the COFS method.

FIG. 10F is the pointwise NFE for the reflection coefficient obtained using the COFS method. The total NFE error is listed at the top.

FIG. 11A is a graph of NFE vs time for different values of γ, averaged over ten different realizations (the high-SNR case).

FIG. 11B is a graph of NFE vs time for different values of γ, averaged over ten different realizations (the low-SNR case).

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. For example, thin features may be thickened, for clarity of illustration.

DETAILED DESCRIPTION

The present invention relates generally to imaging sensors and methods of imaging objects and, more particularly, to computational optical-field sensors that measure both the amplitude and phase of optical light and methods of using the same.

The imaging sensor and method described herein can be used to image objects at various distances from the imaging sensor, and to produce a speckle-free image of the object. In general, the techniques described herein can be applied to any reflective imaging scenario (where light is reflected off an object) at any distance. It could also be used in microscopes that reflect light off the object.

While the present method to remove speckle would be helpful for objects at any distance, the benefits of stitching together images (synthetic aperture imaging) and of cleaning up images (digital adaptive optics) are most pronounced over long ranges where one or both of the following are present: 1) the resolution is limited by the optics, and 2) atmospheric turbulence corrupts the images. Resolution is a function of both aperture size and distance to the object. Therefore, the resolution may be limited at short distances with a small aperture (aperture sizes from a few micrometers to a few inches), or at longer distances with a larger size aperture (aperture sizes from a few inches to a few meters). In certain nonlimiting embodiments, the imaging sensor and method described herein can be used to image objects at distances from the imaging sensor that are from a few (e.g., 2) Km (for imaging earth-based objects) up to 60 Mm (imaging satellites). Whether atmospheric turbulence corrupts the images is a function of distance and aperture size, and also object size. In certain embodiments of interest herein, the distances between the object and the sensor may be between 100 m and 50 km.

The Sensor

Figure 1:
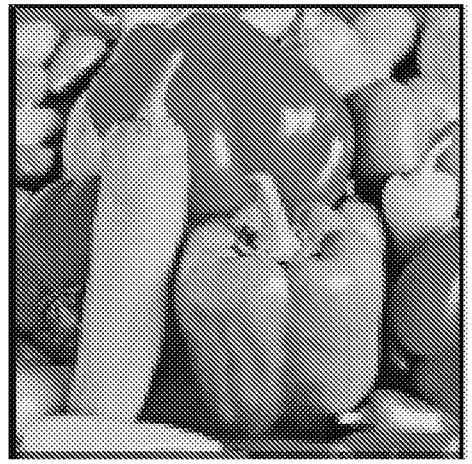
FIG. 1 is a prior art image of an object associated with the real-valued reflectance function, r.
Figure 2:
FIG. 2 is a prior art image of an object associated with the magnitude squared of the complex-valued reflection coefficient, g.
Figure 3:
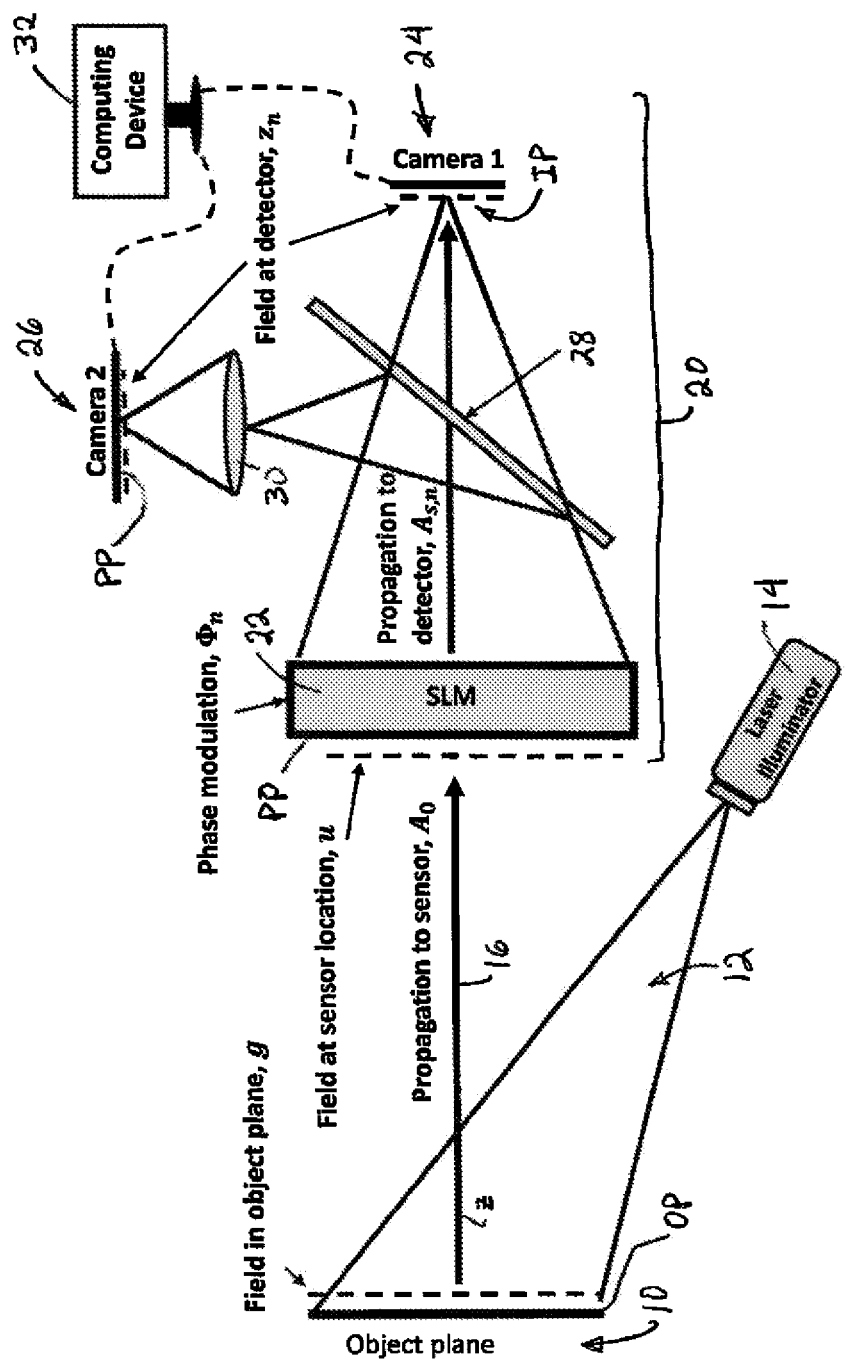
FIG. 3 is a schematic diagram of one embodiment of a sensor according to the present invention in which the primary imaging lens is a spatial light modulator (SLM).

FIG. 3 shows one embodiment of a computational optical-field imaging sensor (COFS) (or simply "sensor") 20 and the method according to the present invention. The imaging sensors and methods described herein may be used to measure the optical field, amplitude and phase, for a coherently illuminated (i.e., illuminated with a laser) object 10. The full optical field or "complex optical field" represents the amplitude and phase with a complex phasor, $A e^{(j f(x))}$. As shown in FIG. 3, the object 10 is illuminated with incident light 12 by a laser 14. Light will be reflected off the object 10 in all directions in the configuration of a half sphere. As shown in FIG. 3, some of the light 16 is reflected off the object 10 in the direction of the imaging sensor 20 and is sensed by the sensor.

FIG. 3 shows that, in one embodiment, the imaging sensor 20 may comprise: a primary imaging lens (such as a spatial light modulator (SLM)) 22; at least one detector (such as first camera 24 and second camera 26); an optional beam splitter 28; and a lens 30. The hardware design, as further described herein, is customizable based on the application. The imaging sensor 20 may further comprise a computing device 32, or be operationally connected to a computing device 32 to form a computational optical-field imaging sensor system.

FIG. 3 shows a number of different optical relationships associated with the operation of the imaging sensor 20. The object 10 defines an object plane OP. The object 10 and sensor 20 can be considered to be located in a Cartesian coordinate system, and the plane defined by the object 10 can be considered to be an x-y plane. In such a case, the object plane OP can be considered to be positioned at any location along the z-axis shown in FIG. 3.

An image plane IP is formed where the light 16 is focused such that it forms a representation of the image that has the appearance of the object 10. In the embodiment shown in FIG. 3, the image plane IP is located at the front of the first camera 24.

A pupil plane PP is formed at the surface of the sensor that gathers the reflected light 16 and that is closest to the object 10. In FIG. 3, the pupil plane PP is located at the front of the SLM. If a lens is used in place of the SLM, the pupil plane PP will be located at the front of the lens. Since it is not possible to place a detector at the front of the SLM or lens without interfering with the transmission of light therethrough, the components of the sensor 20 may be arranged so that the pupil plane PP is also formed at the front of the second camera 26.

FIG. 3 also shows the electromagnetic fields at various locations. These include: a field in the object plane, g; a field at the sensor location, u; and a field at the detectors, $z_n$. The propagation to the sensor 20 is designated $A_0$. The propagation to the detector 24 and 26 is designated $A_{s,n}$.

There are several components of the embodiment of the imaging sensor 20 described above. The primary imaging lens 22 captures light and focuses the light into a detector, such as a camera. The primary imaging lens 22 can be any suitable optical device including a spatial light modulator (SLM) or a conventional lens. In the embodiment shown in FIG. 3, the primary imaging lens 22 is a spatial light modulator (SLM). A spatial light modulator is an optical device that imposes some form of spatially varying phase modulation on a beam of light. Spatial light modulators are further described in U.S. Pat. No. 10,606,055 B2, Horstmeyer, et al. (in which the government of the United States has certain rights).

The SLM introduces a phase only modulation in the pupil plane PP. This phase modulation produces intensity changes in the image plane measurement only (i.e., it is not observed in the pupil plane measurement). In the embodiment shown in FIG. 3, the SLM acts as the lens and also adds a modulation. In any case, the light is focused by either the SLM or the lens, and in the case of an SLM, phase modulation is added. The focusing function forms an image on the camera 24 and the modulation perturbs the light in a pre-determined way.

This embodiment uses a "phase mask" from a device like a spatial light modulator (SLM) to perturb the light in a known manner before it is imaged onto one of the cameras. This provides a diverse set of measurements, each with a unique modulation. The SLM imparts a phase mask through phase modulation. The SLM is a pixelated device that changes the phase at each pixel. The optical phase is represented using the range 0 to 2pi for any point in the field. The SLM can apply different phase changes to each pixel. This acts to either let light pass (0 pi) or slow it down at that point (anything >0 pi). Additionally, rather than applying different phase changes to each pixel, the pixels may be grouped to make "super pixels" where grouped pixels all share the same value (e.g., 0.25 pi). Each pixel, or larger groups of pixels, on the SLM is randomly assigned a value of 0 phase change or X phase change, where X can be any value like pi or pi/2 or pi/4 . . . etc.

The at least one detector can be any suitable type of detection device or devices. In the embodiment shown in FIG. 3, the at least one detector comprises a pair of cameras. The first camera 24 can be any suitable type of camera including but not limited to a charge-coupled device (CCD). The CCD can just be a sensor and does not require a separate lens. The first camera 24 is positioned at a first location in the sensor 20. The first location is located at a place such that the primary imaging lens 22 will be positioned along a propagation path between an object 10 to be imaged and the first camera 24.

The second camera 26 can be any suitable type of camera including but not limited to a charge-coupled device (CCD). The second camera 26 is positioned at a second location relative to the primary imaging lens 22 and lens 30. The second location is offset (at an angle) from the propagation path. The second camera 26 should be positioned at a location where the combination of the primary imaging lens 22 and lens 30 form an image of the pupil plane PP. In other words, the second camera 26 is positioned where the light pattern on the second camera 26 is an image of the light on the pupil plane PP. In general, the second camera 26 should be located a total distance from the primary lens 22 that is equal to the focal length of the primary imaging lens 22 plus the focal length of the secondary lens 30.

The beam splitter 28 is an optical device that splits a beam of light into a transmitted and a reflected beam. The beam splitter 28 in FIG. 3 is positioned between the SLM 22 and the first camera 24. The beam splitter 28 may be oriented at an angle (such as a 45° angle) relative to the propagation path. In the embodiment shown, the transmitted beam travels onto the first camera 24 and the reflected beam is transmitted onto the second camera 26.

The lens 30 is positioned between the beam splitter 28 and the second camera 26. The lens 30 can be any suitable lens that focuses the reflected beam from the beam splitter 28 onto the second camera 26 to form an image of the pupil plane that fully fits on camera 26.

The computing device 32, as discussed above, may comprise part of the imaging sensor 20, or it may be combined with the sensor 20 to form a computational optical-field imaging sensor system. The computing device 32 may be run by software, which may apply the algorithm described below to the measurements taken from the sensor 20.

The sensor 20 in the embodiment shown in FIG. 3 splits the light 16 that is reflected off the object 10 into two paths and sends each path through different optics. Thus, the intensity patterns measured by the cameras 24 and 26 are different, even though they were produced by the same field, u. This difference depends on the difference in optics along the two paths and on the phase of the light. By obtaining these two different measurements, it is possible to gather more information about what the phase of the light must have been.

Splitting the light to obtain two intensity patterns provides measurement diversity. Measurement diversity refers to measuring the same optical field incident on the sensor 20, but with a different measurement process. One option for measurement diversity is to modulate the light with a known pattern (that is what the SLM does in addition to focusing). This produces a slightly different image by perturbing the light compared to the case of no modulation. Another option to obtain measurement diversity is to move to different "planes" within the imaging system, such as by taking a picture at the location of camera 26, in addition to at camera 24. In FIG. 3, the pupil plane PP is used as the alternate place to take a measurement. The pupil plane image is an image of the light that is incent on the sensor's aperture (aka pupil). This additional measurement is accomplished concurrently with the primary measurement by the focal plane camera 24 by splitting the light with the beam splitter 28.

The problem of forming a speckle-free, high-resolution image from low resolution images, or from measurements corrupted by atmospheric turbulence is underdetermined. Underdetermined systems are mathematical systems that have more unknown variables than equations. This means that there are multiple solutions or no unique solution to the system. For example, if there are X knowns (e.g., pixels measured), there would be N*X unknowns (pixels in the final high-resolution image), where N>1. As a result, there are an infinite number of possible images that fit the measurements that are obtained. However, there are two ways to constrain the infinite solution space: 1) increase the number of unique measurements through measurement diversity (to increase the number of knows relative to the number of unknowns), and 2) use a prior model in the estimator described herein that helps avoid solutions that are unlikely.

Figure 4:
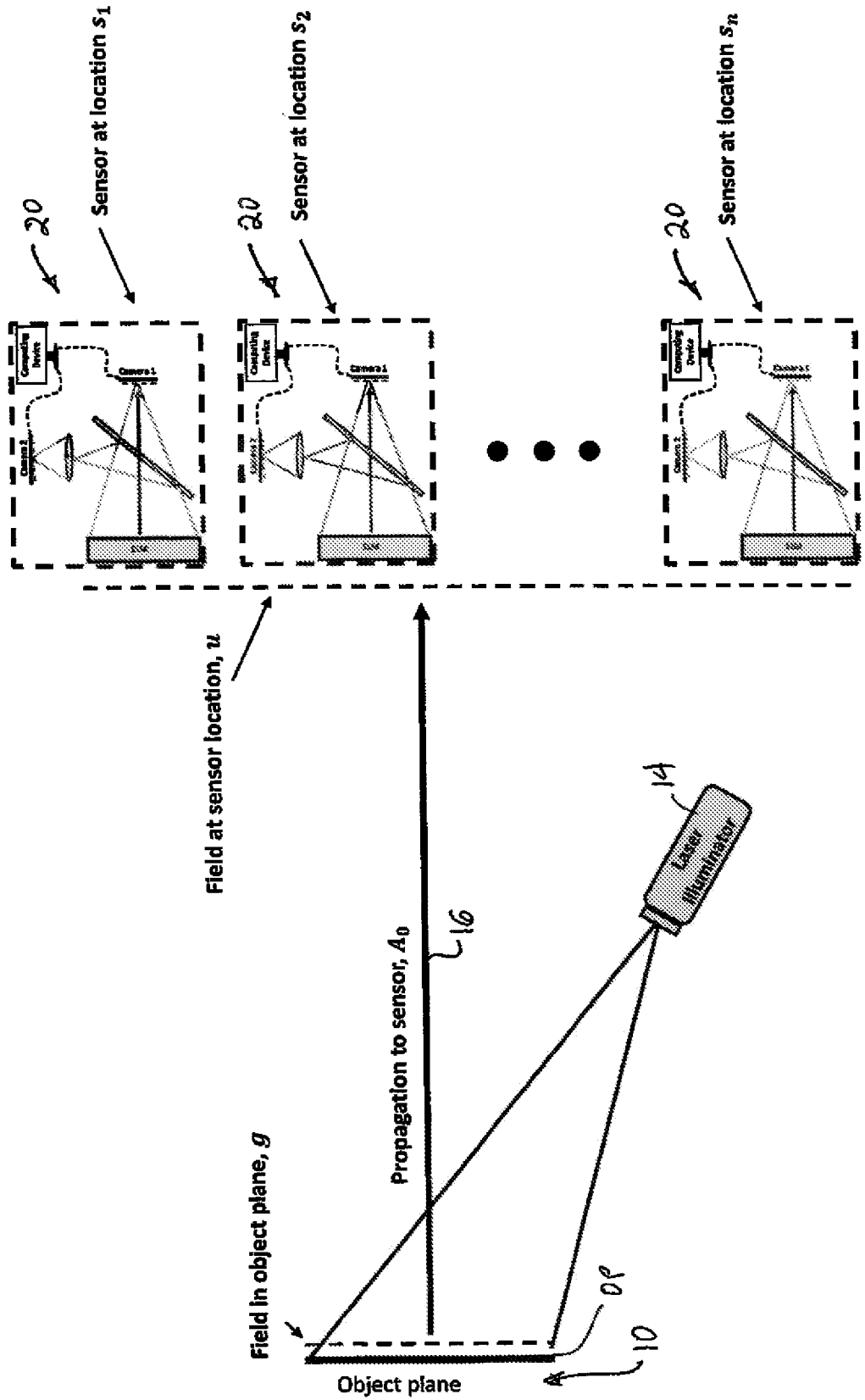
FIG. 4 is a schematic diagram of another embodiment in which the sensor is used at multiple locations.
Figure 5:
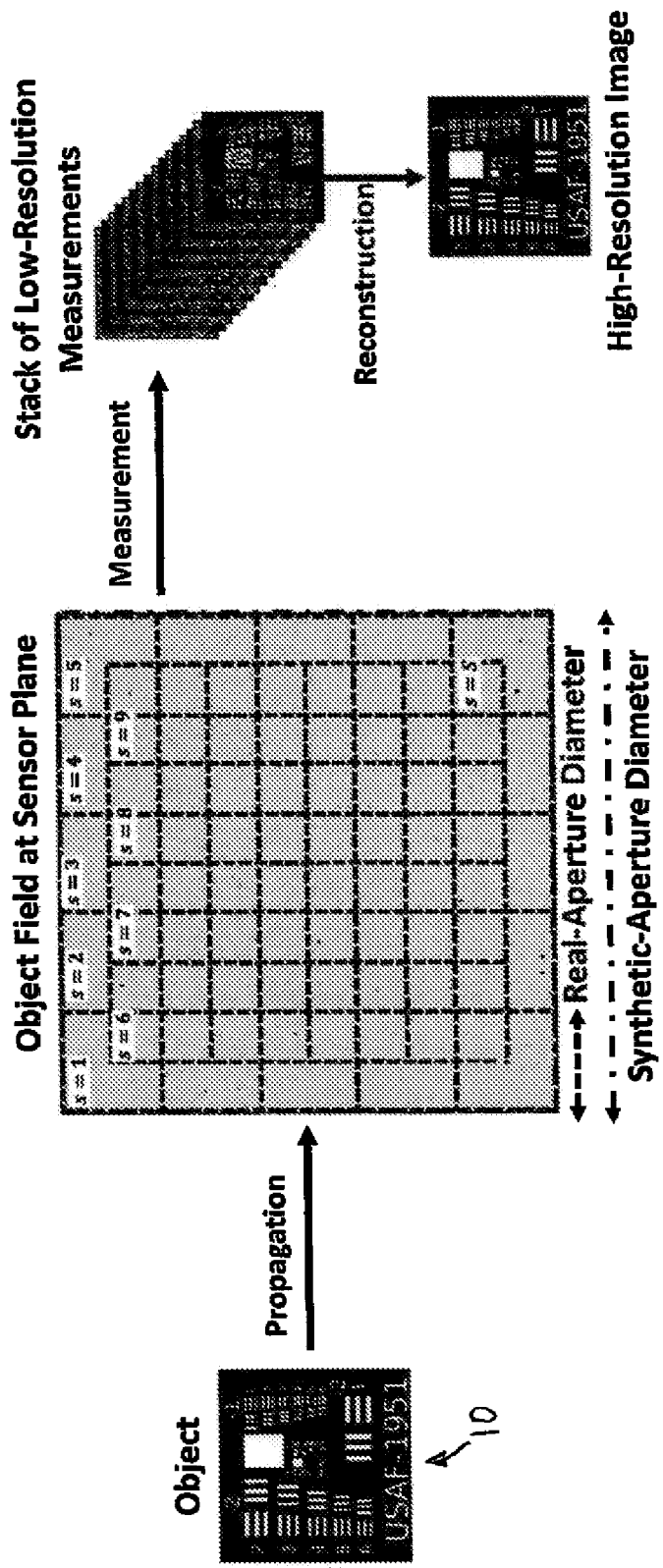
FIG. 5 is a schematic diagram showing the manner in which the method utilizes reconstruction of the image of an object to form a high-resolution image from a plurality of low-resolution measurements.

The sensor 20 may be spatially scanned, or it may be held static while the object 10 is spatially scanned, to form a synthetic aperture to produce an image with resolution beyond the diffraction limit of the sensor optics. FIG. 4 shows that spatially scanning refers to taking a plurality of low-resolution images at slightly different angles (achieved by moving or scanning the entire sensor 20) where each image contains at least a small amount of different information. Unlike conventional sensors, as shown in FIG. 5 with the COFS, these low-resolution images can be stitched together to form a single high-resolution image.

There are numerous, non-limiting embodiments of the sensor and method of the present invention. All embodiments, even if they are only described as being "embodiments" of the invention, are intended to be non-limiting (that is, there may be other embodiments in addition to these), unless they are expressly described as limiting the scope of the invention. Any of the embodiments described herein can also be combined with any other embodiments in any manner to form still other embodiments.

Figure 3A:
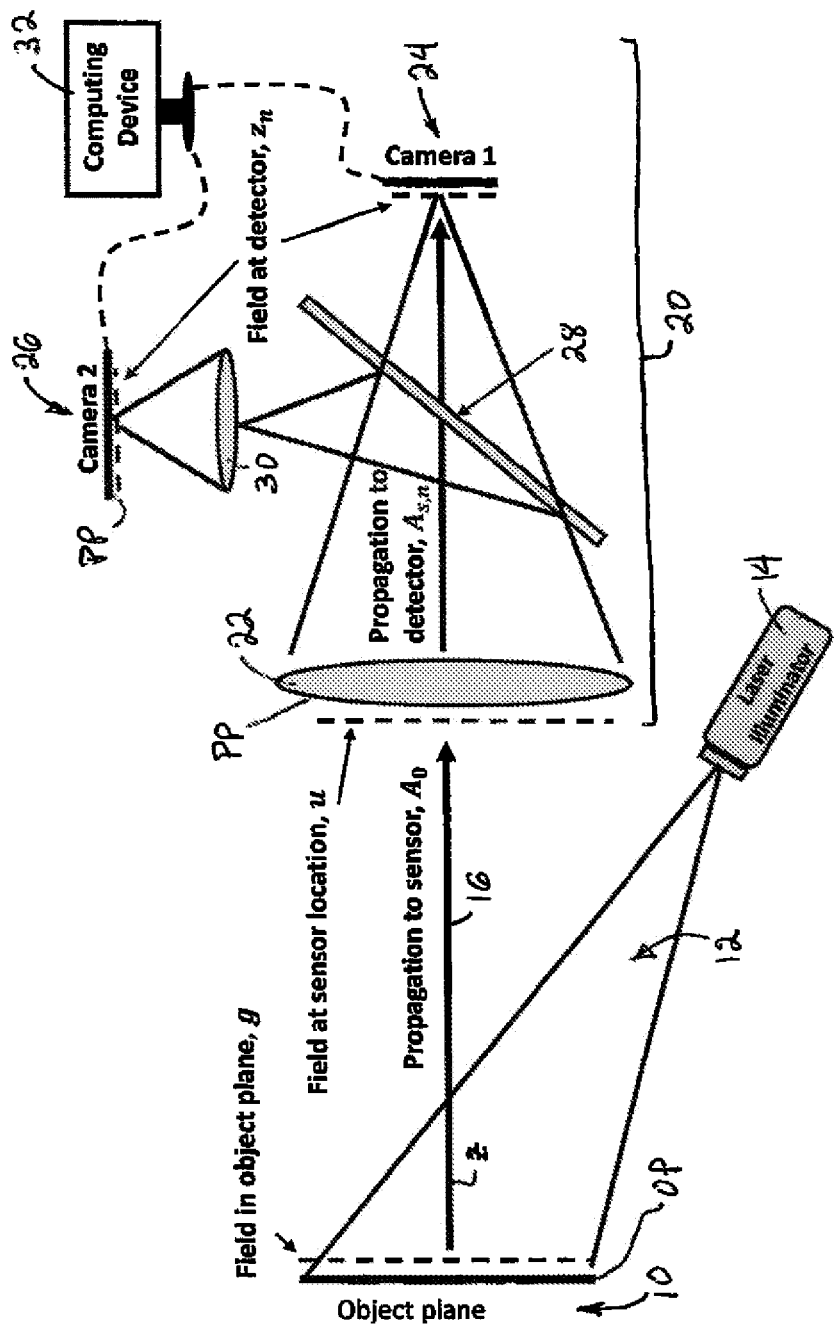
FIG. 3A is a schematic diagram of another embodiment of a sensor in which the spatial light modulator (SLM) is replaced with a conventional lens.

FIG. 3A shows that for applications in which fast measurements are required, the spatial-light-modulator (SLM) can be replaced with a conventional lens 22, and the rest of the components can remain the same. In this embodiment, the reconstruction can be made using a single snapshot of the pupil and image-plane intensities. This avoids having to take multiple measurements in time.

Figure 3B:
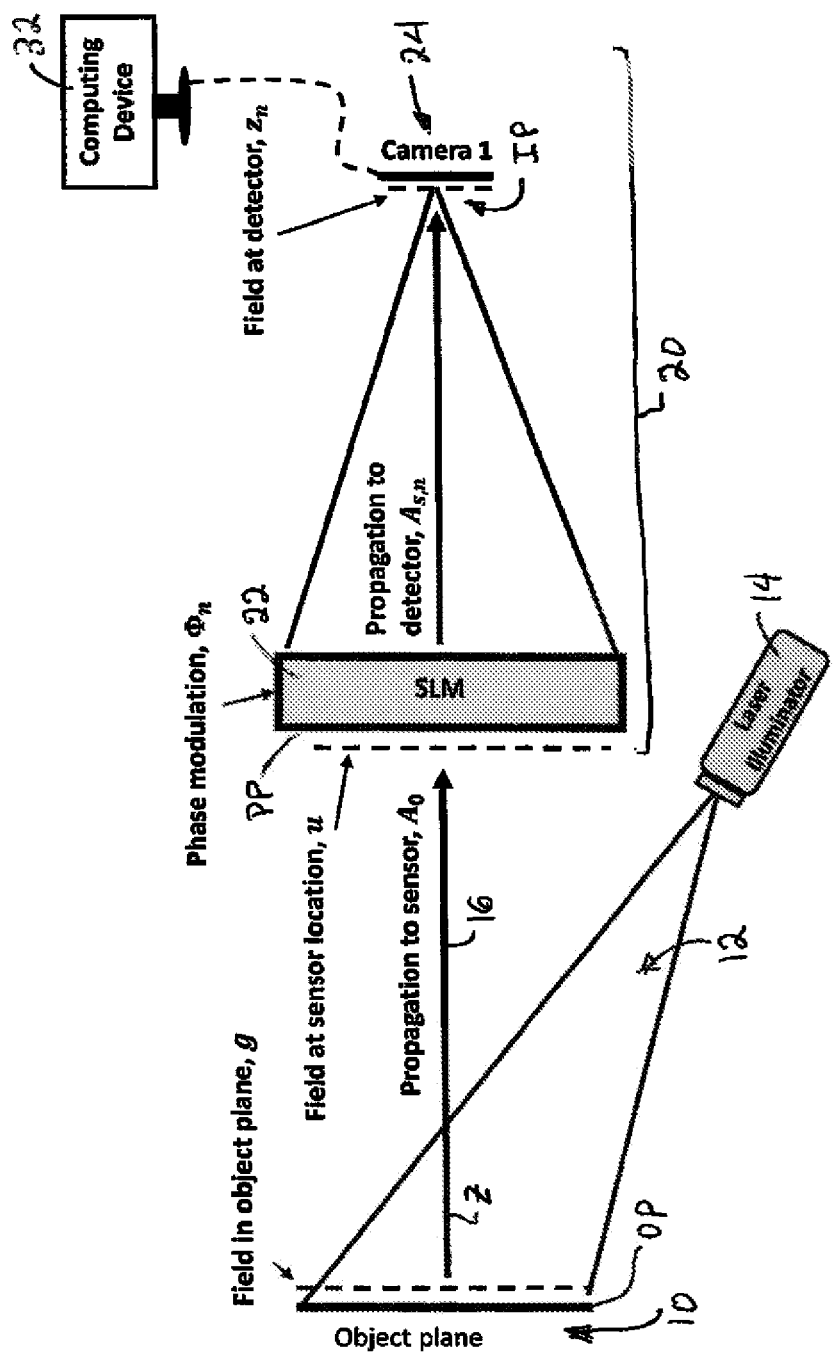
FIG. 3B is a schematic diagram of another embodiment of a sensor in which the pupil-plane measurement is discarded and several image-plane measurements can be taken with modulation from the SLM.

FIG. 3B is a variation of the embodiment shown in FIG. 3 in which second camera, beam splitter 28 and lens 30 are eliminated. The sensor 20 shown in FIG. 3B is useful in applications where signal levels are faint. In this embodiment, the pupil-plane measurement is discarded and several image-plane measurements can be taken with modulation from the SLM. This avoids having to split the light.

Figure 3C:
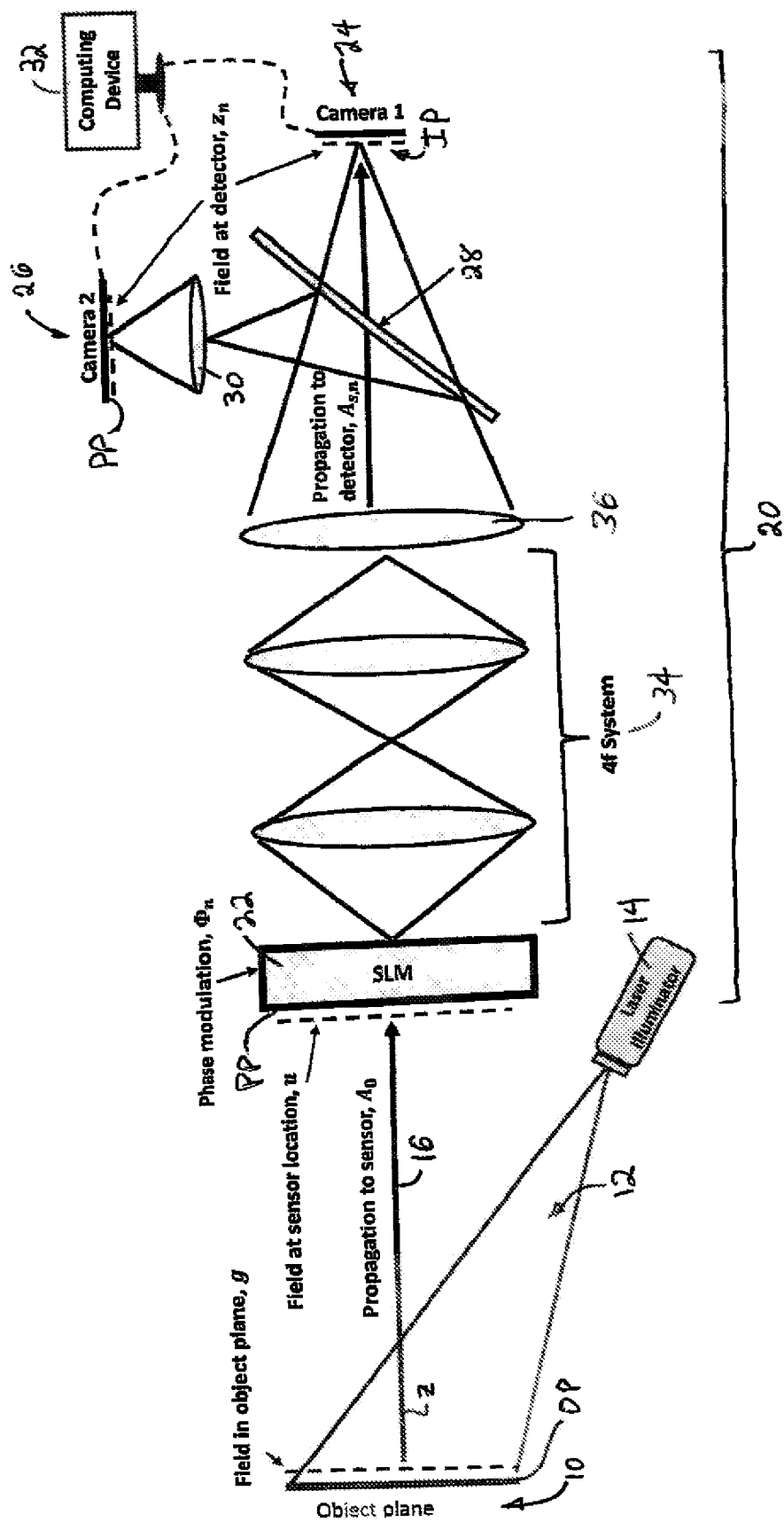
FIG. 3C is a schematic diagram of another embodiment of a sensor similar to FIG. 1 in which a 4f imaging system is used to image the SLM onto a focusing lens.

FIG. 3C is a variation of the embodiment shown in FIG. 3 in which all of the same components are present, plus a 4f imaging system 34 is positioned between the SLM 22 and the beam splitter 28. The 4f imaging system 34 is used to image the SLM 22 onto a focusing lens 36 that is positioned between the 4f imaging system 34 and the beam splitter 28. This avoids having to use the SLM 22 for both phase modulation and focusing, which may cause aberrations.

Figure 3D:
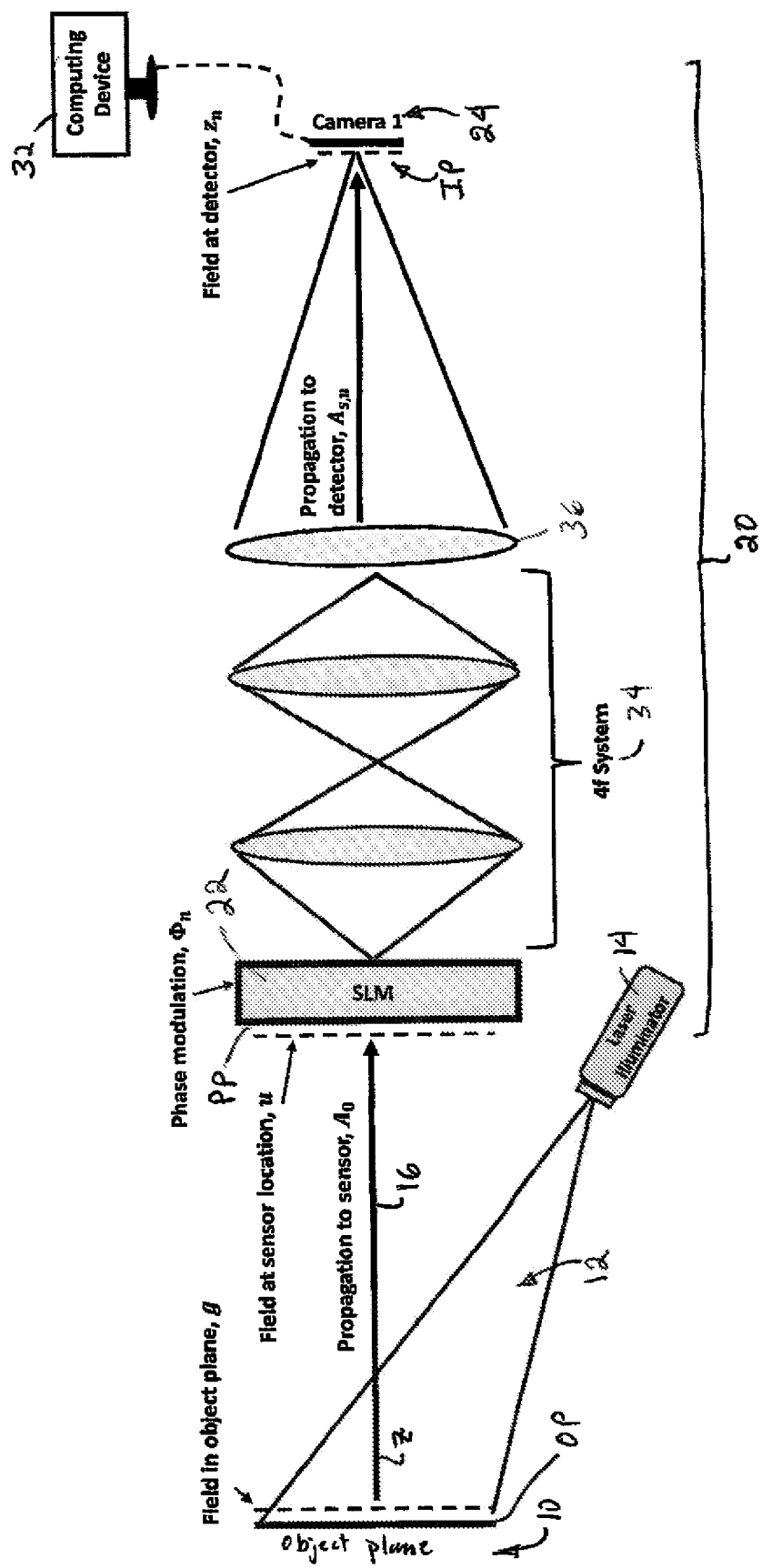
FIG. 3D is a schematic diagram of another embodiment of a sensor similar to FIG. 3B in which a 4f imaging system is used.

FIG. 3D shows an embodiment of a sensor 20 similar to FIG. 3B in which all of the components of the sensor are present, plus a 4f imaging system 34 is positioned between the SLM 22 and the first camera 24. The 4f imaging system 34 is used to image the SLM 22 onto a focusing lens 36 that is positioned between the 4f imaging system 34 and the first camera 24. In this sensor 20, the pupil-plane measurement is discarded and several image-plane measurements can be taken with modulation from the SLM 22.

The sensor 20 (and the corresponding algorithm) may be used at a single location to produce images at the native resolution of the sensor optics and an estimate of the optical field. FIG. 4 shows that the sensor 20 may alternatively be used at multiple locations, s∈S to synthesize a larger aperture, extending the resolution beyond the limits of diffraction. The method described below is a generalized approach that can accommodate either of these two scenarios.

The Method

A method of providing an image and an estimate of the amplitude and phase of the complex field using coherent illumination and direct detection of reflected light from an object is also provided. The method, embodiments of which are shown in FIG. 3 to FIG. 5, may comprise:
  a) illuminating an object 10 with a coherent light source 14 so that the object 10 reflects light 16;
  b) sensing and focusing the reflected light 16 with a primary imaging lens 22 so that the reflected light has a first focus onto an image plane at a detector;
  c) generating measurement diversity of the reflected light 16 and taking a plurality of diverse measurements of the reflected light; and
  d) performing a computational analysis on the measurements in step c) using a reconstruction algorithm to reconstruct an image of an object from the measurements and to determine the optical field in the image plane, wherein the image has one or more of the following properties:
    1) is a focused reduced speckle image;
    2) is a higher resolution image of an object that is reconstructed from a plurality of lower-resolution measurements; and
    3) is corrected for atmospheric turbulence.

The step c) of generating measurement diversity of the light 16 and taking a plurality of diverse measurements of the light 16 can be carried out in a number of different manners as described above including, but not limited to: 1) modulating the light with a known pattern (by the SLM 22); and 2) moving to different planes within the imaging system, such as by taking a picture at the location of camera 26, in addition to at camera 24.

The step d) of performing a computational analysis on the measurements in step c) using a reconstruction algorithm will now be discussed.

The reconstruction software uses a regularized-inversion estimation framework that couples: 1) a data-fidelity model, 2) a physics-based model for optical propagation and rough surface scattering of coherent light, and 3) a convolutional neural network (CNN) model for natural images. The regularized inversion estimation framework is solved iteratively using alternating projection. Compared to existing methods, the system and method produces more-accurate measurements, in less time, at lower signal-to-noise ratios, and with less data.

The Data Model

Figure 4A:
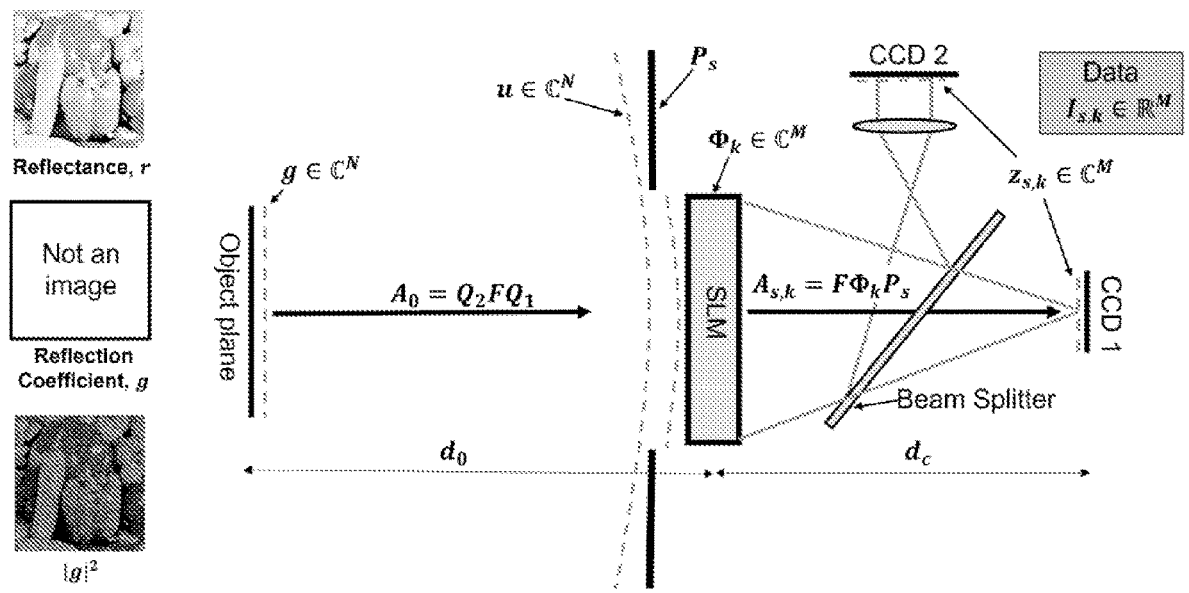
FIG. 4A is a schematic diagram of the sensor and the data models.

The sensor and the data models are shown in FIG. 4A. The following notations are used herein:
  $r \in \mathbb{R}^N$—real-valued object reflectance,
  $g \in \mathbb{C}^N$—complex-valued reflection coefficient,
  $A_0 \in \mathbb{C}^{N \times N}$—linear propagation matrix between object and pupil plane,
  $u \in \mathbb{C}^N$—complex-valued field in sensor plane,
  $P_s \in \mathbb{R}^{M \times N}$—Matrix that represents the binary sub sampling of the full resolution field, u at location s∈S. This matrix converts a vector of length N to a length of M.
  $\Phi_k \in \mathbb{C}^M$—kth complex-valued phase modulation function
  $A_{s,k} \in \mathbb{C}^{M \times M}$—Matrix that combines the sub sampling of the full-resolution field using $P_s$ and the linear propagation between pupil and CCD planes.
  $z_{s,k} \in \mathbb{C}^M$—complex-valued field at CCD plane for kth complex-valued modulation function and sth sensor location. For pupil-plane measurements, use $z_{p:s,k}$
  $I_{s,k} \in \mathbb{R}^M$—real-valued intensity measurements for kth complex-valued modulation function and sth sensor location. For pupil-plane measurements, use $I_{p:s,k}$ As discussed previously, the method obtains measurement diversity two different ways: (1) modulation of the pupil field and (2) by obtaining both image and pupil-plane measurements. The sensor can be tailored for different applications by using just one of these approaches or both. Using just modulation, splitting the light for each measurement is avoided, but at least two sequential measurements in time must be taken. This is beneficial for signal-starved applications. Alternatively, obtaining dual-plane measurements allows just one measurement to be taken at each location, but this requires splitting the light. This is beneficial when the scene is dynamic. When possible, using both methods provides a diverse set of data that helps improve robustness and convergence speed.

Given the sensor 20 architecture described above, for the $k^{th}$ measurement at location s, the data is modeled as $$\sqrt{I_{s,k}} = |z_{s,k}| + w_k,$$

$$= |A_{s,k} u| + w_k,$$

$$= |A_{s,k} A_0 g| + w_k, \qquad (3)$$

where $w_{s,k} \in \mathbb{R}^M$ is real-valued noise. An additive Gaussian noise model is assumed for the amplitude (i.e., the square root of the measured intensity), where $$p(w) \sim N(0, \sigma_w^2 I), \qquad (4)$$

and I represents the identity matrix.

In Eq. (3), the linear propagation models are given by $$A_0 = Q_2 F Q_1, \qquad (5)$$

and $$A_{s,k} = F D_{\Phi_k} P_s, \qquad (6)$$

where F is a Fourier transform matrix and $Q_1 \in \mathbb{C}^{N \times N}$ and $Q_2 \in \mathbb{C}^{N \times N}$ are diagonal matrices that apply the quadratic phase associated with the Fresnel integral, and $D_x$ is an operator that creates a diagonal matrix from its vector argument, x. For pupil plane measurements, the second propagation model simplifies to $A_{s,k} = P_s$.

For coherently-illuminated objects, g is modeled as a conditionally complex Gaussian random variable with distribution $$p(g|r) \sim CN(0, D_r, 0), \qquad (7)$$

Where $p(\cdot|\cdot)$ represents a conditional probability distribution and $CN(\mu, C, \Gamma)$ indicates a multivariate complex normal distribution with mean, $\mu$, covariance matrix, C, and pseudo-covariance matrix, $\Gamma$. Using Eq. (7), the object's real-valued reflectance, r, and the speckle field, g, can be related.

The Reconstruction Algorithm

With the above models in mind, the reconstruction can be framed as $$(\hat{g}, \hat{r}) = \min_{r,g} \left\{ \frac{1}{\sigma_w^2} \sum_{s=1}^{S} \sum_{k=1}^{K} |||z_{s,k}| - |A_{s,k} A_0 g|||^2 - \log p(g, r) \right\} \qquad (8)$$

$$\min_{r,g} \left\{ \frac{1}{\sigma_w^2} \sum_{s=1}^{S} \sum_{k=1}^{K} |||z_{s,k}| - |A_{s,k} A_0 g|||^2 - \log p(g|r) - \log p(r) \right\}$$

where the joint distribution p(g, r) is used as the regularization function, which incorporates the physics model for rough-surface scattering that causes speckle. Equations 3-7 all incorporate physics-modeling into the reconstruction process given by Eq. 8.

The pupil field u is introduced as an auxiliary variable, and Eq. (8) is solved using alternating projection (AP). In practice, AP works by iteratively projecting an estimate onto different solution sets. As an example, the Gerchberg-Saxon (GS) algorithm is an AP algorithm. It iteratively transitions between the pupil plane and image plane, constraining the estimate in both domains. In the present case, the method projects back and forth between the measurement domain and the reflectance domain. The AP framework is split into a series of six update steps given by:

$$u \leftarrow \frac{1}{K} \sum_{s=1}^{S} \sum_{k=1}^{K} A_{s,k}^H z_{s,k}, \qquad (9)$$

$$g \leftarrow \min_g \left\{ \frac{1}{\sigma_w^2} \|u - A_0 g\|^2 - \log p(g|r) \right\}, \qquad (10)$$

$$r \leftarrow \min_r \{-\log p(g|r) - \log p(r)\}, \qquad (11)$$

$$g \leftarrow \min_g \left\{ \frac{1}{\sigma_w^2} \|u - A_0 g\|^2 - \log p(g|r) \right\}, \qquad (12)$$

$$u \leftarrow A_0 g, \qquad (13)$$

$$z_{s,k} \leftarrow \min_{z_{s,k}} \left\{ \sum_{k=1}^{K} |||z_{s,k}| - |A_{s,k} u|||^2 \right\}, \forall s \in S, \qquad (14)$$

Figure 6:
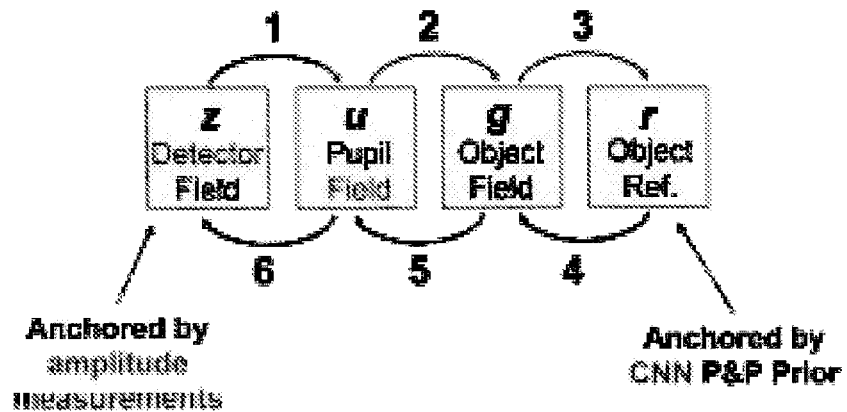
FIG. 6 is a schematic diagram showing the series of forward and backward updates.

This sequence of updates represents a backward projection, updating quantities from the sensor field to the reflectance function, and a forward projection, updating quantities from the reflectance function to the sensor field. In the sensor plane, the present process is constrained by the data model. In the reflectance domain, it is constrained by the prior model p(r). In between, the physics-based models that relate z, u, g, and r, are incorporated. FIG. 6 shows a diagram of the six-step process.

The updates represent a series of backward (from the sensor to object, Eqs. 9-11) and forward (from the object to the sensor Eqs. 11-14) updates. On the left side of FIG. 6, the process is constrained by the data model, on the right, it is constrained by the prior model for r.

This backward-forward process alternates between projections of the complex-optical field onto the set of data-consistent solutions and the set of prior-consistent solutions, until it finds a solution consistent with both. On the backward pass, information about measurements, $I_{s,k}$, is propagated to estimates of u and g. That information then helps update r in a way that is consistent with the new g and with the prior model, p(r). On the forward pass, the new updated r, which was updated with information from p(r), is used to update estimates of g and u. This process is repeated until it converges to a solution that no longer changes between projections.

Equations (10) and (12) are solved using a closed form solution. To solve Eq. (11), a single iteration of the multi-agent consensus equilibrium (MACE) framework is used. This framework is a generalization of PnP that allows the incorporation of a deep convolution neural network (CNN) prior model for p(r). Finally, to solve Eq. (14), a single iteration of the GS algorithm is used. This provides a fast and efficient solution. However, since this step is just one part of the AP process, the method is able to overcome the limitations of GS. More details about how solving each of the optimization problems given by Eqs. (9-14) are provided below. Note that for the update given by Eq. (9), regions of overlap between neighboring measurements are accounted for by dividing each element in u by the number of measurements obtained at that location.

Update Equations

Update of g

To solve for g, Eq. (10) is written as $$g \leftarrow \min_g \left\{ \frac{1}{\sigma_w^2} \|u - A_0 g\|^2 - \log p(g|r) \right\}, \qquad (16)$$

$$= \min_g \left\{ \frac{1}{\sigma_w^2} \|u - A_0 g\|^2 - g^H D_r^{-1} g \right\}.$$

In this form, the loss function for this update is a quadratic function of g. By expanding and completing the square, the minimum of the loss function has a closed form given by $$g^* = \left[\frac{1}{\sigma_w^2}A_0^H A_0 + D_r^{-1}\right]^{-1} A_0^H u. \tag{17}$$

In this case, $A_0^H A_0 = I$, and we simplify Eq. (17) to get $$g^* = D_\zeta A_0^H u, \tag{18}$$

$$\zeta = \frac{\sigma_w^2}{1 + \frac{\sigma_w^2}{r}}. \tag{19}$$

Note that while g* is the minimizer of Eq. (16), it is also equivalent to a Wiener deconvolution that filters the field u using information about r.

Update of r

To solve Eq. (11), Multi-Agent Consensus Equilibrium (MACE) is used. MACE provides a set of balance equations that moderates a solution to a problem given multiple agents with differing objectives. Here, the agents are proximal maps associated with the data terms (i.e., terms involving g), and the prior term.

The MACE equations are defined as $$\begin{bmatrix} F_r(r_1^*) \\ H_r(r_2^*) \end{bmatrix} = \begin{bmatrix} r^* \\ r^* \end{bmatrix}. \tag{20}$$

where F is the data agent, H is the prior agent, $r_1$, and $r_2$ are state vectors and $r^* = (r_1^* + r_2^*)/2$. The agents reach equilibrium when they produce a common output, $r^*$, given the input state vectors. To solve Eq. (20), the Mann iteration is used. The update equations are given by $$w_r \leftarrow \begin{bmatrix} F_r(r_1) \\ H_r(r_2) \end{bmatrix} \tag{21}$$

$$r \leftarrow r + 2\rho[G(2w_r - r) - w_r],$$

where $r = [r_1^T, r_2^T]^T$. and ρ is a scalar parameter that controls the rate of convergence. Here, G is an averaging and stacking operator defined as $$G(r) = \begin{bmatrix} \bar{r} \\ \vdots \\ \bar{r} \end{bmatrix}. \tag{22}$$

The data agent is a proximal map that projects an arbitrary input, $r_{in}$ onto the reflection-coefficient manifold. It is given by $$F_r(r_{in}) = \min_r\left\{-\log p(g|r) + \frac{1}{2\sigma_F^2}\|r - r_{in}\|^2\right\}, \tag{23}$$

$$= \min_r\left\{-\log|D_r| + g^H D_r^{-1} g + \frac{1}{2\sigma_F^2}\|r - r_{in}\|^2\right\},$$

The update for each pixel during this minimization is decoupled and has a closed-form solution. The solution is equivalent to rooting the 3rd order polynomial. Note that agent $F_r$ is parameterized by $\sigma_F^2$ which controls the strength of the projection.

For the prior agent, $H_r$ start with a proximal map given by $$H_r(r_{in}) = \min_r\left\{-\log p(r) + \frac{1}{2\sigma_H^2}\|r - r_{in}\|^2\right\}. \tag{24}$$

A Plug and Play (PnP) approach is employed for solving Eq. (24). The benefit of PnP is that it allows the proximal map, given by Eq. (24), to be replaced with a convolutional neural network (CNN) denoiser, G, designed to remove Gaussian noise with variance $\sigma_H^2$. $H_r$ is, therefore, implemented according to $$H_r(r_{in}) = g(r_{in}). \tag{25}$$

For this work, a modified version of the denoising convolutional neural network (DnCNN) architecture is used for G. The CNN has inherently learned the distribution of natural images through the training process.

In summary, Eq. (11) is solved using one update of MACE, given by Eq. (21). Data agent, F, is applied by minimizing Eq. (23) using a closed form solution as described above. For the prior agent, H, the input, $r_2$, is fed into to a convolutional neural network (CNN) trained to remove Gaussian noise with variance $\sigma_H^2$ from images.

Update of $z_{s,k}$

To solve Eq. (14), for each $z_{s,k}$, a single iteration of the GS algorithm given by $$u_s \leftarrow \sqrt{I_{p;s,n}} \frac{u_s}{|u_s|},$$

if a pupil-plane measurement is available, (26)

$$z_{s,k} \leftarrow F D_{\Phi_k} u_s, \forall k, \tag{27}$$

$$z_{s,k} \leftarrow \sqrt{I_{sk}} \frac{z_{sk}}{|z_{sk}|}, \forall k, \tag{28}$$

is used where $u_s = P_s u$. In Eq. (26), the amplitude of $u_s$ is updated using the pupil-plane measurement, if available. Next, in Eq. (27), the updated pupil plane is propagated to the image plane. Finally, the amplitude of $z_{s,k}$ updated using the image-plane measurement.

Extension for Digital Adaptive Optics

The computational optical-field sensor (COFS) described herein is suitable use for sensing and digitally correcting phase errors that result from atmospheric turbulence. While the focus is on this Digital Adaptive Optics (DAO) task for a single aperture location, $s \in S$, the approach can be extended to multiple locations for synthetic aperture imaging.

Figure 7:
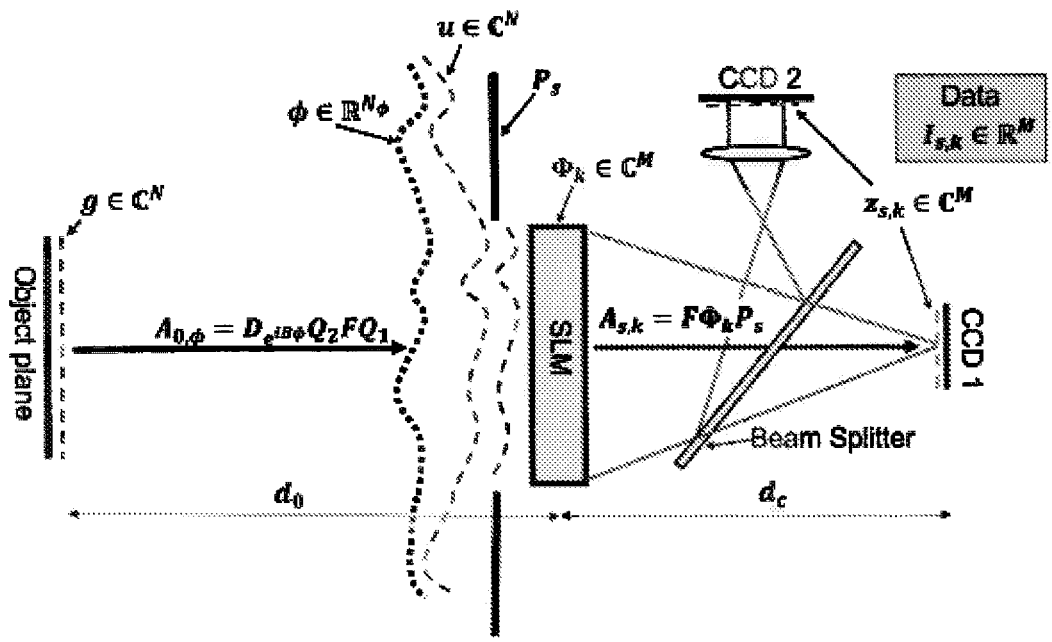
FIG. 7 is a schematic diagram of a sensor according to the present invention in the presence of atmospheric turbulence.

FIG. 7 shows the COFS sensor in the presence of atmospheric turbulence. This turbulence causes phase errors, ϕ, near the sensor's aperture. In this case, the optical phase of the field, u, becomes distorted by ϕ and the new propagation model becomes:

$$A_{0,\phi} = D_e i B \phi F D_{\Phi_k} P_s, \tag{29}$$

where B is a nearest-neighbor interpolation matrix that allows one to model $\phi \in \mathbb{R}^{N_\phi}$ a low resolution grid when $N_\phi < N$. This low-resolution representation allows reduces the number of unknowns during reconstruction.

With phase errors present, a blurry and aberrated image is obtained. Combined with speckle and measurement noise, these phase errors make it difficult to infer information about the object from the images. Therefore, it is useful to sense and digitally correct these abberations to produce more-useful images. In some cases, such as wave-front sensing, information about $\phi$ is the desired output of the sensing process.

Modified Algorithm

In this section, the computational optical-field sensor (COFS) is adapted to jointly compute $\phi$ in addition to g and r. The modified reconstruction problem is $$(\hat{g}, \hat{\phi}, \hat{r}) = \min_{g,\phi,r}\left\{\frac{1}{\sigma_w^2}\sum_{s=1}^{S}\sum_{k=1}^{K}|||z_{s,k}|-|A_{s,k}A_{0,\phi}g|||^2 - \log p(g, \phi, r)\right\} \quad (30)$$

$$= \min_{g,\phi,r}\left\{\frac{1}{\sigma_w^2}\sum_{s=1}^{S}\sum_{k=1}^{K}|||z_{s,k}|-|A_{s,k}A_{0,\phi}g|||^2 - \log p(g|r) - \log p(r) - \log p(\phi)\right\}$$

where it is assumed that $\phi$ is independent from r and g. Here $p(\phi)$ is the prior model for turbulence induced phase errors. A Gaussian Markov Random Field (GRMF) model is used for $p(\phi)$ that captures the spatial correlation between neighboring elements.

As with the original problem, Eq. (30) is solved using AP. In this case, it is split into a series of eight update steps. These eight update steps are given by $$u \leftarrow \frac{1}{K}\sum_{s=1}^{S}\sum_{k=1}^{K}A_{s,}^H z_{s,k}, \quad (31)$$

$$\phi \leftarrow \min_{\phi}\left\{\frac{1}{\sigma_w^2}\|u - A_{0,\phi}g\|^2 - \log p(\phi)\right\}, \quad (32)$$

$$g \leftarrow \min_{g}\left\{\frac{1}{\sigma_w^2}\|u - A_{0,\phi}g\|^2 - \log p(g|r)\right\}, \quad (33)$$

$$r \leftarrow \min_{r}\{-\log p(g|r) - \log p(r)\}, \quad (34)$$

$$g \leftarrow \min_{g}\left\{\frac{1}{\sigma_w^2}\|u - A_{0,\phi}g\|^2 - \log p(g|r)\right\}, \quad (35)$$

$$\phi \leftarrow \min_{\phi}\left\{\frac{1}{\sigma_w^2}\|u - A_{0,\phi}g\|^2 - \log p(\phi)\right\}, \quad (36)$$

$$u \leftarrow A_{0,\phi}g, \quad (37)$$

$$z_{s,k} \leftarrow \min_{z_{s,k}}\left\{\sum_{k=1}^{K}|||z_{s,k}|-|A_{s,k}u|||^2\right\}, \forall s \in S, \quad (38)$$

Figure 8:
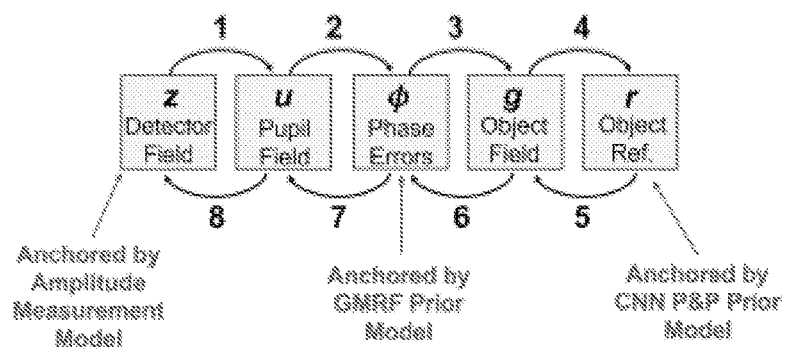
FIG. 8 is an alternative flow chart showing the iterative update steps.
Figure 9A:
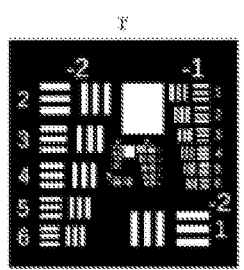
FIG. 9A is a USAF bar chart that is used for the reflectance function, r.
Figure 9B:
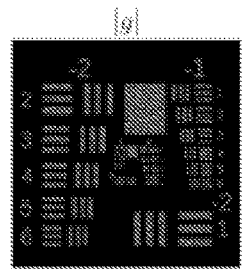
FIG. 9B is the magnitude of a random draw of the reflection coefficient, g, generated from the complex normal distribution g~CN(0, $D_r$, 0), where $D_r$ is a diagonal matrix with the reflectance function, r, on the diagonal.
Figure 9C:
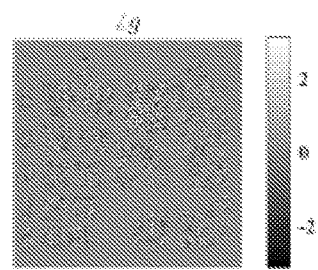
FIG. 9C is the phase of the reflection coefficient, g.
Figure 9D:
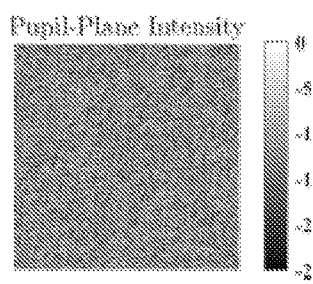
FIG. 9D is the intensity (magnitude squared) of the optical field at the pupil plane after propagating the reflection coefficient, g, from the object plane, to the sensor plane.
Figure 9E:
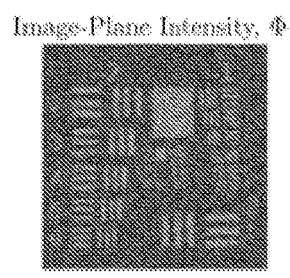
FIG. 9E is the intensity of the optical field in the image plane for a given modulation function, $\Phi_1$, applied to the SLM.
Figure 9F:
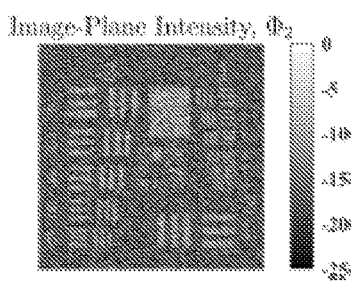
FIG. 9F is the intensity of the optical field in the image plane for a modulation function, $\Phi_2$, different from $\Phi_1$ applied to the SLM.
Figure 12A:
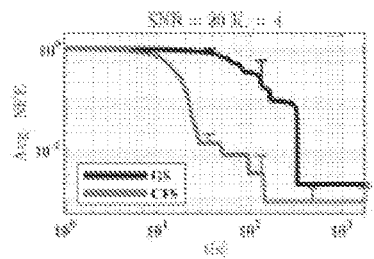
FIG. 12A is a graph of NFE vs time for GS and the COFS algorithm with an SNR of 20 and a K of 4.
Figure 12B:
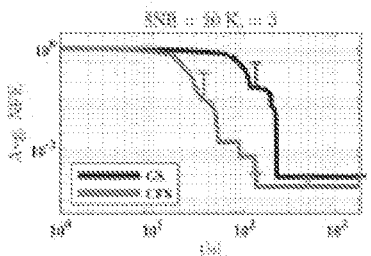
FIG. 12B is a graph of NFE vs time for GS and the COFS algorithm with an SNR of 20 and a K of 3.
Figure 12C:
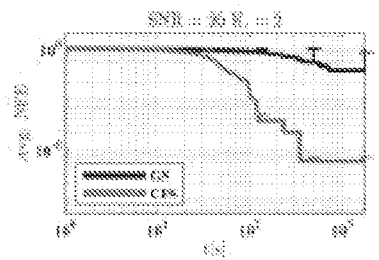
FIG. 12C is a graph of NFE vs time for GS and the COFS algorithm with an SNR of 20 and a K of 2.
Figure 12D:
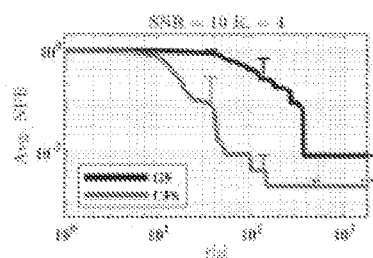
FIG. 12D is a graph of NFE vs time for GS and the COFS algorithm with an SNR of 10 and a K of 4.
Figure 12E:
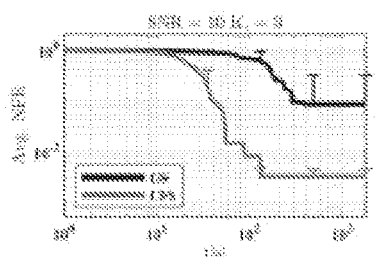
FIG. 12E is a graph of NFE vs time for GS and the COFS algorithm with an SNR of 10 and a K of 3.
Figure 12F:
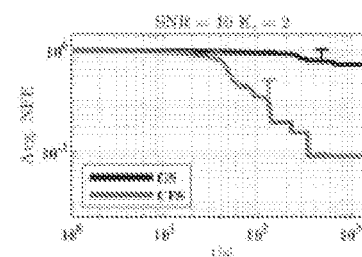
FIG. 12F is a graph of NFE vs time for GS and the COFS algorithm with an SNR of 10 and a K of 2.
Figure 12G:
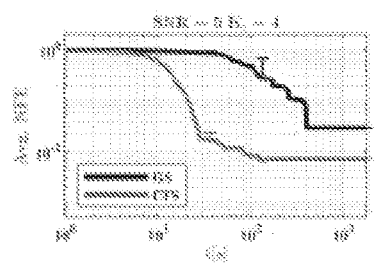
FIG. 12G is a graph of NFE vs time for GS and the COFS algorithm with an SNR of 5 and a K of 4.
Figure 12H:
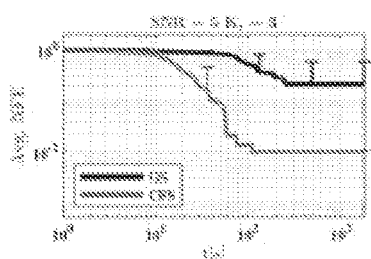
FIG. 12H is a graph of NFE vs time for GS and the COFS algorithm with an SNR of 5 and a K of 3.
Figure 12I:
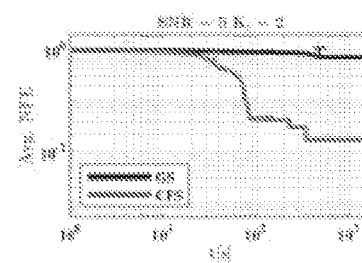
FIG. 12I is a graph of NFE vs time for GS and the COFS algorithm with an SNR of 5 and a K of 2.
Figure 12J:
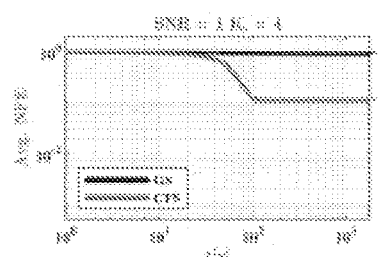
FIG. 12J is a graph of NFE vs time for GS and the COFS algorithm with an SNR of 1 and a K of 4.
Figure 12K:
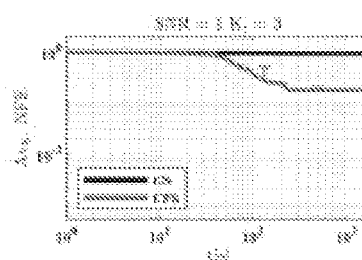
FIG. 12K is a graph of NFE vs time for GS and the COFS algorithm with an SNR of 1 and a K of 3.
Figure 12L:
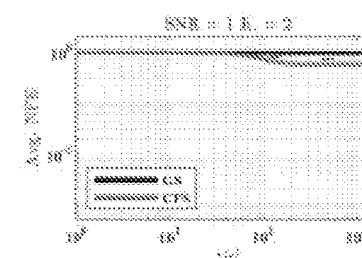
FIG. 12L is a graph of NFE vs time for GS and the COFS algorithm with an SNR of 1 and a K of 2.

Equation (32) and Eq. (36) are solved using iterative coordinate descent and by conducting a line search to update each element in $\phi$. FIG. 8 shows a graphic depiction of these update steps.

In summary, the system and method for measuring the optical phase of incident light using direct detection and for producing speckle-free images is designed for use with coherent illumination and reflective imaging geometries. The hardware may combine both phase modulation of the pupil plane and dual-plane measurements of the image and pupil-plane intensities to improve robustness and convergence accuracy and speed. The reconstruction software uses a regularized-inversion estimation framework that couples a data-fidelity model, a physics-based model for rough surface scattering of coherent light, convolutional neural network model for natural images, and alternating projection to solve for the amplitude and phase and produce a speckle-free image. The regularized inversion framework is solved iteratively using alternating projection.

The imaging sensors and methods described herein have numerous uses including military uses and nonmilitary uses. Applications include speckle mitigation for active imaging, resolution enhancement using synthetic aperture methods, and digitally correcting aberrations in images or refocusing. Military uses include, but are not limited to: long-range imaging for intelligence, surveillance, and reconnaissance (ISR) which includes combat identification, and imaging geosynchronous satellites from the ground. Also, wave-front sensing applications where it is necessary to measure optical aberrations such as atmospheric turbulence. Nonmilitary uses include, but are not limited to Lidar sensors for autonomous vehicles.

The system and method described herein can provide a number of advantages. It should be understood, however, that these advantages need not be required unless they are set forth in the appended claims.

The system and method may be used to form a focused speckle-free image. The system and method may be used to form an image with higher resolution than the native resolution of each individual measurement limited by the size of the optics, rather than producing many low resolution images that are phased together. The system and method may be used to determine the atmospheric phase errors present along the propagation path between the illuminated object and the pupil plane for which the test function is at an extremum. The system and method may be used to form a focused speckle-free image from a measured image distorted by atmospheric turbulence.

Compared to existing methods, the system and method produces more accurate measurements, in less time, at lower signal-to-noise ratios, and with less data. The method described herein is faster than methods that use the Gerchberg-Saxon (GS) algorithm. It is robust to laser speckle and measurement noise. It works with single speckle realization. The method can be used to directly obtain resolution enhancement using synthetic aperture methods. It does not require a separate aperture phasing step. It digitally corrects for aberrations using digital adaptive optics and allows refocusing of blurry images. There are no restrictions on oversampling or object support.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1—Phase Retrieval Performance Analysis

In the first example, the performance of the present method for solving the PR problem is assessed. In particular, we describe the process used to generate simulated data, select algorithm hyperparameters, and compare performance to the Gerchberg-Saxon (GS) algorithm. Since the other PR approaches described above fail when applied to speckle fields, GS represents the performance baseline for the present application.

Data Generation

To assess the PR performance of the present method, synthetic data is generated using a wave-optics simulation. For this experiment, the USAF bar chart is used as the reflectance function, r. A reflection coefficient, g, according to Eq. (7) is then generated. Next, g is propagated to the pupil plane of the sensor using standard numerical methods for modeling Fresnel propagations of monochromatic waves. For this simulation, the physical size of the 256×256 object grid is set to be 6.8×6.8 cm, and the 256×256 pupil-plane grid to be 1×1 cm. The propagation distance is set to 5 m and the aperture pupil is a square of length 1 cm, representing the active area of the SLM. Next, a phase-only modulation, $\Phi_k$, is applied to the field and propagated to a 256×256 image plane with a physical size of 5×5 mm. The detection of the intensity is simulated in both the image and pupil planes by taking the magnitude squared of the field and applying Poisson shot noise and Gaussian read noise with a standard deviation of $\sigma_{rn}=10$ pe. The output is digitized by modeling a well depth of $5\times10^4$ photoelectrons (pe) with a 12-bit readout. To simulate K measurements, one pupil-plane image and (K−1) image-plane measurements are generated, each with a different $\Phi_k$. The strength of the pupil-plane field is scaled to obtained the desired SNR levels. Here, SNR for the pupil-plane image is defined as $$SNR = \frac{\mu_{I_p}}{\sqrt{\mu_{I_p} + \sigma_{rn}}}, \tag{39}$$

where, $\mu_{I_p}$ is the mean number of pe detected by each pixel. FIGS. 9A-9F show example inputs and outputs for this simulation.

For both GS and COFS, the output estimates of the reflectance, and the optical-field, as shown in FIG. 10A-10F. To assess performance, NFE is used, given by Eq. (2), and MATLAB's Peak SNR (PSNR) function. NFE provides a quantitative measure for the quality of our field estimate and PSNR provides a measure of image quality.

Practical Considerations and Hyperparameter Selection

Using the synthetic data described above, the proposed algorithm is tested to find the optimal hyperparameter values. It is found that normalizing the data, I, so that it ranged between zero and one, simplifies this process. The proposed COFS framework has a total of six hyperparameters. It is possible to fix all but one of these hyperparameters and still provide good reconstruction quality over a wide range of conditions. Table 1 lists the six hyperparameters along with their values. The fixed parameters are chosen to minimize NFE using MATLAB's particle-swarm global-search algorithm. For simplicity, a single $N_{it}$ value is used that ensures convergence is reached for all cases considered; however, this number can be reduced for the more-benign cases (i.e., for higher values of SNR and K).

TABLE 1

PARAMETERS USED FOR COFS ALGORITHM

| Parameters | Value |
|---|---|
| Fixed | |
| Strength of data agent projection, $\sigma_V^2$ | $1 \times 10^{-4}$ |
| Strength of prior agent projection, $\sigma_H^2$ | $9 \times 10^{-4}$ |

TABLE 1-continued

PARAMETERS USED FOR COFS ALGORITHM

| Parameters | Value |
|---|---|
| Phase-only modulation strength, $\Phi_k$ | 0 or 0.6 w, randomly assigned to each pixel with 50% prob. |
| Convergence rate for Mann iteration, p | 0.8 |
| Number of iterations, $N_\alpha$ Variable | 200 |
| Noise variance, $\sigma_w^2$ | [1.00, 0.80, 0.60, 0.40] (for SNR > 1) [1.00, 0.92, 0.86, 0.80] (for SNR ≤ 1) |

The value of $\sigma_w^2$ represents the relative strength of the noise and its optimal value therefore depends on the SNR. Thus, for high SNRs, a smaller $\sigma_w^2$ is optimal, and for low SNRs, a larger $\sigma_w^2$ was optimal. Furthermore, it is found this parameter has a large impact on convergence speed. FIG. 7 shows convergence plots for different values of $\sigma_w^2$, for both SNR=30 and SNR=1. Here, the parameterization is simplified by setting $\sigma_w^2 = \gamma \sigma_u^2$, where $\sigma_u^2$ is the variance of the initial estimate of u and $\gamma$ is a unitless scalar.

FIG. 11A shows that a high value of $\gamma$ decreases the NFE quickly, but progress stalls at a relatively high final NFE. For the SNR=30 case, $\gamma$=0.8 achieves the lowest NFE, but convergence is slower than for the $\gamma$=1.0 case. Lower values of $\gamma$ converge to relatively high NFEs. FIG. 11B shows similar results for the low-SNR case.

Based on these observations, a bootstrapping process is developed to iteratively reduce the value of $\gamma$. The process starts with $\gamma$=1 and is run for $N_{it}$ iterations. Then, all variables are reinitialized except for the field u, and $\gamma$ is decreased. This process is repeated until the lowest value of $\gamma$ is reached, which depends on the SNR. For each discrete value of $\gamma$, $N_{it}$ iterations are run. FIGS. 11A and 11B show that this bootstrapping process achieves better results than any fixed value of $\gamma$. This process reduces NFE quickly and achieves a low final NFE.

PR Results

Using the simulation described above, data is generated over a wide range of conditions and the present method is compared to GS. SNRs of 20, 10, 5, and 1, and for K=4, 2, and 2 measurements are simulated. For each of these scenarios, ten different independent realizations are simulated. The same simulation process is used for both the GS and COFS algorithms with the following exception. For GS, all but one of the image-plane measurements are modulated, whereas for COFS, all image-plane measurements are modulated. For the conditions considered here, GS fails completely without this modification. Thus, to provide a fair comparison, in terms of performance for a given number of measurements, GS is provided with the types of measurements that worked best.

The average NFE vs time plots are shown in FIGS. 12A to 12L, along with error bars. These results show that the COFS algorithm outperforms GS at the PR task over the set of conditions considered. On average, COFS converges faster and to lower NFEs in all cases. Furthermore, COFS converges when GS is not able to. For example, when the SNR is low, or when K=2, GS produces a high NFE, while COFS is able to produce significantly better results.

As used herein, an element or step recited in the singular and preceded with the word "a" or "an" should be understood as including the plural of such elements or steps, unless the plural of such elements or steps is specifically excluded.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of providing an image and an estimate of the amplitude and phase of the optical field using coherent illumination and direct detection of reflected light from an object, said method comprising:
   a) illuminating an object with a coherent light source so that the object reflects light;
   b) sensing and focusing the reflected light with a primary imaging lens so that said reflected light has a first focus onto an image plane at a detector;
   c) generating measurement diversity of the reflected light and taking a plurality of diverse measurements of said reflected light; and
   d) performing a computational analysis on said measurements in step c) using a reconstruction algorithm to reconstruct an image of an object from said measurements and to determine the optical field in the image plane, wherein the image has one or more of the following properties:
      1) is a focused reduced speckle image;
      2) is a higher resolution image of an object that is reconstructed from a plurality of lower-resolution measurements; and
      3) is corrected for atmospheric turbulence.

2. The method of claim 1 wherein the measurement diversity in step c) is created by modulating the phase of the reflected light, wherein the modulating occurs before the light is focused onto the image plane at said detector.

3. The method of claim 2 wherein the primary imaging lens is a spatial light modulator (SLM), and the phase modulation is carried out by the spatial light modulator (SLM).

4. The method of claim 2 wherein the step c) further comprises one of the following:
   1) splitting said reflected light into two portions, wherein a first portion of said reflected light has a first set of measurements measured by said detector which is a first detector at the image plane, and a second portion of said light has a second set of measurements measured by a second detector at a pupil plane; or
   2) taking several image plane measurements following modulation.

5. The method of claim 1 wherein the step c) of generating measurement diversity of the light and taking a plurality of diverse measurements of said light is carried out using one of the following hardware configurations:
   1) with a spatial light modulator (SLM) prior to said detector, wherein said measurements comprise sequential measurements that are taken at said detector;
   2) with a primary imaging lens, and splitting the light into two portions wherein a first portion of said light is transmitted to said detector, which is a first camera, and a second portion of said light is transmitted to a second camera, wherein said measurements are taken at said first camera and said second camera; and
   3) with a spatial light modulator (SLM) prior to said detector, and splitting the light into two portions wherein a first portion of said light is transmitted to said detector, which is a first camera, and a second portion of said light beam is transmitted to a second camera, wherein said measurements are taken at said first camera and said second camera.

6. The method of claim 1 wherein the computational analysis in step d) comprises a process in which potential solutions are proposed for the reflectance function, the reflection coefficient, and the phase errors caused by turbulence, and the potential solutions are compared against:
   1) the data measurements using physics models for rough surface scattering, optical propagation, and light detection, and
   2) statistical models for natural images and turbulence-induced phase errors,
   wherein only solutions that could have produced the data measured, according to the physics models, and that have a high probability of being from the set of natural images and turbulence-induced phase errors are selected.

7. The method of claim 1 wherein the object has a complex-valued reflection coefficient, g, and a real-valued reflectance function r, and the computational analysis in step d) comprises alternating between a series of update steps for each of the complex-valued reflection coefficient, g, and the real-valued reflectance function r, wherein the update steps comprise computing with one of 1) equations having a closed form solution, or 2) a test function which is probed to find extrema, wherein the output of each update equation, which is either a closed form solution or an extrema, respectively, represents an intermediate estimate of either the complex-valued optical field or the reflectance function.

8. The method of claim 7 wherein the step c) further comprises splitting said reflected light into two portions, wherein a first portion of said reflected light has a first set of measurements measured by said detector which is a first camera at the image plane, and a second portion of said light has a second set of measurements measured by a second camera at a pupil plane, wherein the pupil plane and the image plane each define a complex-valued field, and the update steps are as follows, and the update steps are carried out one or more times:
   1) the complex-valued field in the pupil plane is obtained from the complex-valued field in the camera planes using an update equation with a closed form solution;

2) a test function is generated using the output of step 1 and probed to find the complex-valued reflection coefficient for which the test function is at an extrema;
3) a test function is generated using the output of step 2 and probed to find the real-valued reflectance for which the test function is at an extrema;
4) a test function is generated using the outputs of Steps 1 and 3 and probed to find the complex-valued reflection coefficient for which the test function is at an extrema;
5) the complex-valued field in the pupil plane is obtained using the outputs from step 4 using an update equation with a closed form solution; and
6) a test function is generated for each camera measurement, as a function of both location and modulation function used, using the output of step 5 and probed to find the complex-valued field in the camera planes for which each test function is at an extrema.

9. The method of claim 7 wherein the step c) further comprises splitting said reflected light into two portions, wherein a first portion of said reflected light has a first set of measurements measured by said detector which is a first camera at the image plane, and a second portion of said light has a second set of measurements measured by a second camera at a pupil plane, wherein the pupil plane and the image plane each define a complex-valued field, and the update steps are as follows, and the update steps are carried out one or more times:
1) the complex-valued field in the pupil plane is obtained from the complex-valued field in the camera planes using an update equation with a closed form solution;
2) a test function is generated using the output from step 1 and probed to find the atmospheric phase errors for which the test function is at an extrema;
3) a test function is generated using the output of steps 1 and 2 and probed to find the complex-valued reflection coefficient for which the test function is at an extrema;
4) a test function is generated using the output of step 3 and probed to find the real-valued reflectance for which the test function is at an extrema;
5) a test function is generated using the outputs of steps 1, 2, and 4 and probed to find the complex-valued reflection coefficient for which the test function is at an extrema;
6) a test function is generated using the outputs from steps 1 and 5 and probed to find the atmospheric phase errors for which the test function is at an extrema;
7) the complex-valued field in the pupil plane is obtained using the outputs from steps 5 and 6 using an update equation with a closed form solution; and
8) a test function is generated for each camera measurement, as a function of both location and modulation function used, using the output of step 7 and probed to find the complex-valued field in the camera planes for which each test function is at an extrema.

10. The method of claim 7, further comprising forming a focused reduced speckle image from the estimated reflectance values for which the test function is at an extremum.

11. The method of claim 7, further comprising determining the complex-valued optical field in the image plane from the estimated reflection coefficient for which the test function is at an extremum.

12. The method of claim 7, further comprising forming an image with higher resolution than the native resolution of each individual measurement limited by the size of the optics.

13. The method of claim 7, further comprising determining the atmospheric phase errors present along the propagation path between the illuminated object and the pupil plane for which the test function is at an extremum.

14. The method of claim 7, further comprising forming a focused reduced speckle image from a measured image distorted by atmospheric turbulence.

15. The method of claim 7 wherein the step c) further comprises splitting said reflected light into two portions, wherein a first portion of said reflected light has a first set of measurements measured by said detector which is a first camera at the image plane, and a second portion of said light has a second set of measurements measured by a second camera at a pupil plane, wherein the pupil plane and the image plane each define a complex-valued field, wherein the update equations are dependent upon:
1) a physics-based model for the propagation of the optical field between the image plane the pupil plane for each camera location and modulation function;
2) a data fidelity term dependent on the complex-valued field in the pupil plane, the reflection coefficient, and a physics-based model for the propagation of the optical field between the pupil and object planes;
3) a first regularization term dependent on the reflection coefficient, reflectance, and a physics-based model for rough-surface scattering;
4) a second regularization term dependent on the reflectance and which uses a convolutional neural network to learn the distribution of natural images; and
5) a data fidelity term dependent on the measured intensity on each camera, the estimated optical field in the pupil plane, and a physics-based model for the propagation of the optical field between the pupil plane the image plane for each camera location and modulation function.

16. The method of claim 15 wherein the update equations and test functions are further dependent upon an additional regularization term that is dependent on the atmospheric phase errors.

17. The method of claim 15 wherein probing the test functions is performed for a plurality of iterations.

18. The method of claim 17 wherein the complex-valued fields in the image plane are initialized using the square root of the intensity of the image-plane measurements as the amplitude and a random array for the phase.

19. The method of claim 18 wherein the complex-valued field in the pupil plane is initialized using physics-based model for the propagation of the optical field between the image plane and the pupil plane for each camera location and modulation function.

20. The method of claim 16 wherein the atmospheric phase errors are initialized using a uniform array (i.e., zeros).

21. The method of claim 19 wherein the reflection coefficient is initialized using the complex-valued field in the pupil plane a physics-based model for the propagation of the optical field between the pupil plane and the object plane.

22. The method of claim 21 wherein the reflectance is initialized using the magnitude squared of the reflection coefficient.

* * * * *